(12) United States Patent
Wang et al.

(10) Patent No.: US 10,892,671 B2
(45) Date of Patent: Jan. 12, 2021

(54) ELECTRICALLY CONDUCTIVE COPPER COMPONENTS AND JOINING PROCESSES THEREFOR

(71) Applicant: GM GLOBAL TECHNOLOGY OPERATIONS LLC, Detroit, MI (US)

(72) Inventors: Hongliang Wang, Sterling Heights, MI (US); Chen Zhou, Troy, MI (US); Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 446 days.

(21) Appl. No.: 15/659,003

(22) Filed: Jul. 25, 2017

(65) Prior Publication Data

US 2019/0036429 A1    Jan. 31, 2019

(51) Int. Cl.
| | |
|---|---|
| *H02K 15/02* | (2006.01) |
| *B23K 26/00* | (2014.01) |
| *B23K 26/352* | (2014.01) |
| *C23C 4/12* | (2016.01) |
| *H02K 3/50* | (2006.01) |

(Continued)

(52) U.S. Cl.
CPC ............ *H02K 15/02* (2013.01); *B23K 11/115* (2013.01); *B23K 11/18* (2013.01); *B23K 26/0006* (2013.01); *B23K 26/0622* (2015.10); *B23K 26/282* (2015.10); *B23K 26/352* (2015.10); *B23K 26/354* (2015.10); *B23K 26/3584* (2018.08); *C23C 4/08* (2013.01); *C23C 4/12* (2013.01); *C23C 24/04* (2013.01); *H02K 1/16* (2013.01); *H02K 3/14* (2013.01); *H02K 3/50* (2013.01); *H02K 15/024* (2013.01); *B23K 2101/34* (2018.08); *B23K 2101/35* (2018.08); *B23K 2101/36* (2018.08); *B23K 2101/42* (2018.08); *B23K 2103/12* (2018.08); *H02K 2203/09* (2013.01)

(58) Field of Classification Search
CPC .. H02K 15/02; H02K 15/024; H02K 2203/09; H02K 1/16; H02K 3/50; H02K 3/14; B23K 26/0078; B23K 26/352; B23K 26/0006; B23K 26/3584; B23K 26/354; B23K 26/0622; B23K 26/282; B23K 2203/12; B23K 11/18; B23K 11/115; B23K 2101/36; B23K 2101/42; B23K 2101/35; B23K 2101/34; B23K 2103/12; C23C 4/12; C23C 4/08; H05K 3/027; H05K 3/4038; H05K 3/00; H05K 3/022–08; H05K 3/10; H05K 3/101–207; H05K 3/26; Y10T 29/49155; Y10T 29/49156–49167
USPC ......... 29/846, 829, 825, 847–853, 874, 876, 29/885, 596
See application file for complete search history.

(56) References Cited

U.S. PATENT DOCUMENTS

| | | | | |
|---|---|---|---|---|
| 5,512,131 | A | * | 4/1996 | Kumar ................... G03F 7/165 |
| | | | | 438/738 |
| 5,517,758 | A | * | 5/1996 | Nakamura ............. C23C 18/22 |
| | | | | 174/266 |

(Continued)

*Primary Examiner* — Peter Dungba Vo
*Assistant Examiner* — Kaying Kue
(74) *Attorney, Agent, or Firm* — Quinn IP Law

(57) ABSTRACT

Methods of manufacturing electrically conductive copper components for electric devices and method of joining electrically conductive copper components are provided. Each of the electrically conductive copper components are manufactured to include a preexisting coating of joining material located on or adjacent to a joining surface thereof.

16 Claims, 10 Drawing Sheets

(51) Int. Cl.
*H02K 3/14* (2006.01)
*B23K 26/354* (2014.01)
*C23C 24/04* (2006.01)
*C23C 4/08* (2016.01)
*B23K 11/18* (2006.01)
*B23K 11/11* (2006.01)
*B23K 26/0622* (2014.01)
*B23K 26/282* (2014.01)
*H02K 1/16* (2006.01)
*B23K 101/36* (2006.01)
*B23K 103/12* (2006.01)
*B23K 101/42* (2006.01)
*B23K 101/34* (2006.01)

(56) References Cited

U.S. PATENT DOCUMENTS

| | | | | |
|---|---|---|---|---|
| 5,826,330 A * | 10/1998 | Isoda | ................ | H05K 3/0035 29/852 |
| 6,217,987 B1 * | 4/2001 | Ono | ................ | G03F 7/032 174/250 |
| 6,242,079 B1 * | 6/2001 | Mikado | ................ | H05K 3/383 428/209 |
| 6,251,502 B1 * | 6/2001 | Yasue | ................ | H05K 3/0094 174/255 |
| 6,286,207 B1 * | 9/2001 | Oura | ................ | C23C 18/1608 205/126 |
| 6,541,126 B1 * | 4/2003 | Yoshioka | ................ | H05K 3/025 428/624 |
| 6,591,495 B2 * | 7/2003 | Hirose | ................ | B23K 26/389 29/846 |
| 6,775,907 B1 * | 8/2004 | Boyko | ................ | H05K 3/108 29/846 |
| 7,036,214 B2 * | 5/2006 | Kondo | ................ | H05K 3/4691 29/825 |
| 7,415,761 B2 * | 8/2008 | Hirose | ................ | H05K 3/383 29/852 |
| 8,166,646 B2 * | 5/2012 | Sugahara | ................ | B41J 2/1634 29/842 |
| 8,198,544 B2 * | 6/2012 | Nakai | ................ | H05K 1/0242 174/255 |
| 8,263,878 B2 * | 9/2012 | Takenaka | ................ | H05K 3/4682 174/262 |
| 8,278,564 B2 * | 10/2012 | Shim | ................ | H05K 3/0038 174/262 |
| 8,356,404 B2 * | 1/2013 | Tsuda | ................ | H05K 3/108 29/825 |
| 8,410,374 B2 * | 4/2013 | Furuta | ................ | H05K 1/111 174/257 |
| 8,628,818 B1 * | 1/2014 | Sharma | ................ | H05K 3/10 427/97.3 |
| 10,213,878 B2 * | 2/2019 | Schroth | ................ | B23K 9/167 |
| 2002/0033275 A1 * | 3/2002 | Sumi | ................ | H05K 1/095 174/262 |
| 2003/0148136 A1 * | 8/2003 | Yamamoto | ................ | H05K 3/384 428/607 |
| 2005/0039948 A1 * | 2/2005 | Asai | ................ | H01L 23/49827 174/262 |
| 2005/0121229 A1 * | 6/2005 | Takai | ................ | B32B 15/20 174/261 |
| 2006/0289203 A1 * | 12/2006 | Oda | ................ | H05K 3/4069 174/264 |
| 2008/0052904 A1 * | 3/2008 | Schneider | ................ | H01L 21/486 29/846 |
| 2009/0283316 A1 * | 11/2009 | Shim | ................ | H05K 3/384 174/262 |
| 2010/0125113 A1 * | 5/2010 | Xiao | ................ | C08G 59/502 523/468 |
| 2011/0155433 A1 * | 6/2011 | Funaya | ................ | H05K 1/115 174/258 |
| 2012/0055013 A1 * | 3/2012 | Finn | ................ | H05K 3/103 29/600 |
| 2013/0011736 A1 * | 1/2013 | Loveness | ................ | H01M 4/0492 429/212 |
| 2013/0067742 A1 * | 3/2013 | Nakamura | ................ | B32B 37/025 29/846 |
| 2014/0096382 A1 * | 4/2014 | Huang | ................ | H05K 3/0038 29/852 |
| 2015/0037675 A1 * | 2/2015 | Izuhara | ................ | H01M 4/80 429/221 |
| 2015/0251281 A1 * | 9/2015 | Hebuterne | ................ | B23K 9/042 219/76.14 |
| 2015/0289384 A1 * | 10/2015 | Iwashita | ................ | H05K 3/185 174/250 |
| 2016/0194759 A1 * | 7/2016 | Kim | ................ | C23C 18/1641 174/250 |
| 2016/0218603 A1 | 7/2016 | Schroth et al. | | |
| 2016/0234935 A1 * | 8/2016 | Kohiki | ................ | C25D 7/0614 |

* cited by examiner

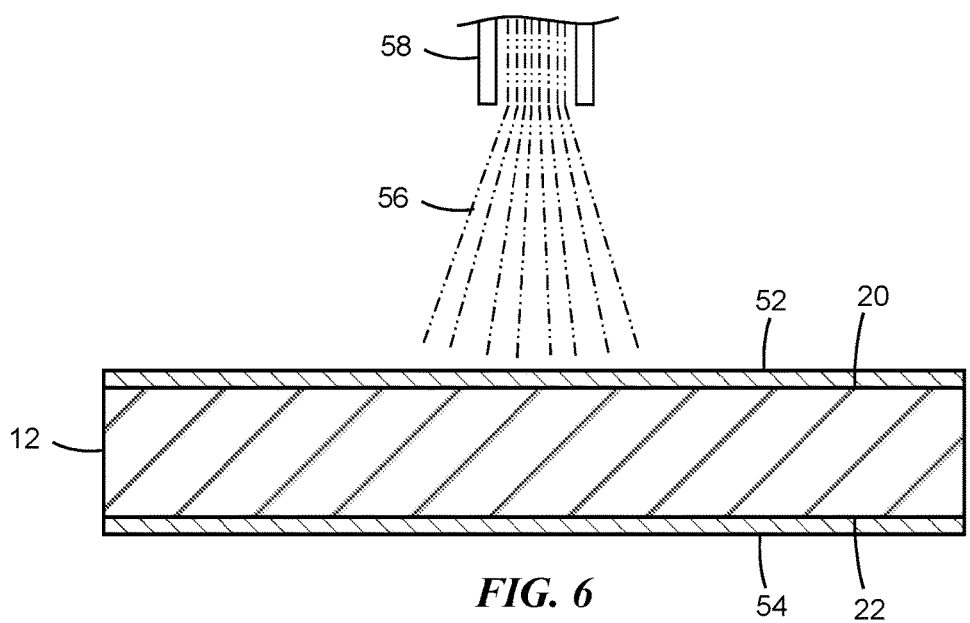
FIG. 6
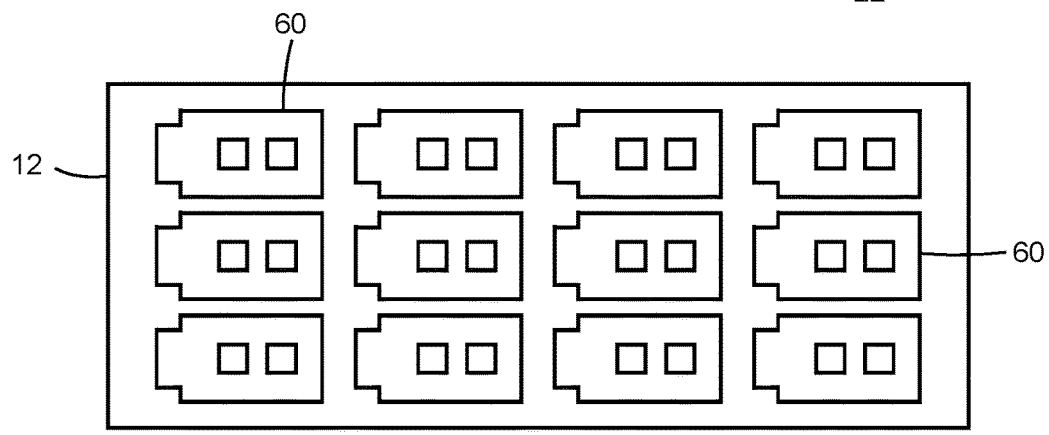
FIG. 7
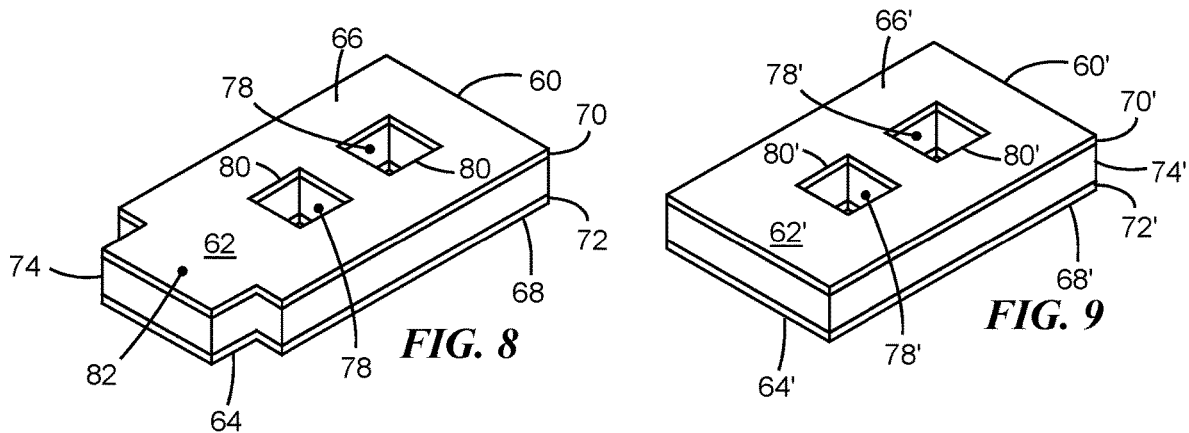
FIG. 8
FIG. 9

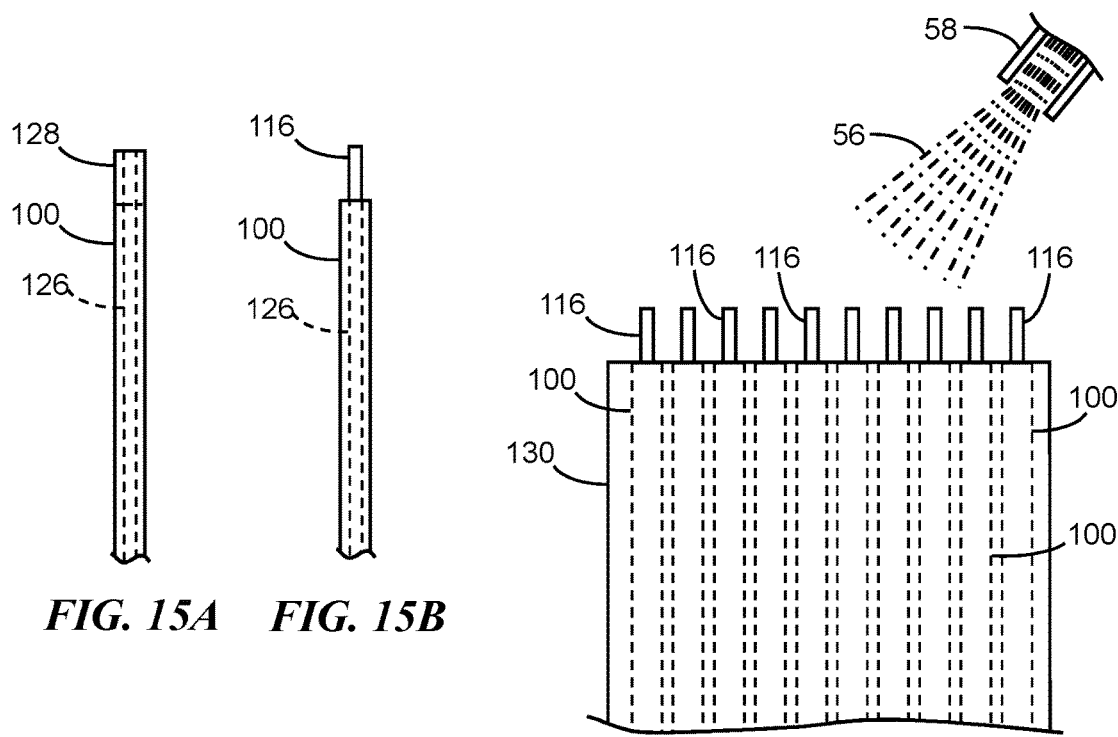
FIG. 15A  FIG. 15B
FIG. 15C
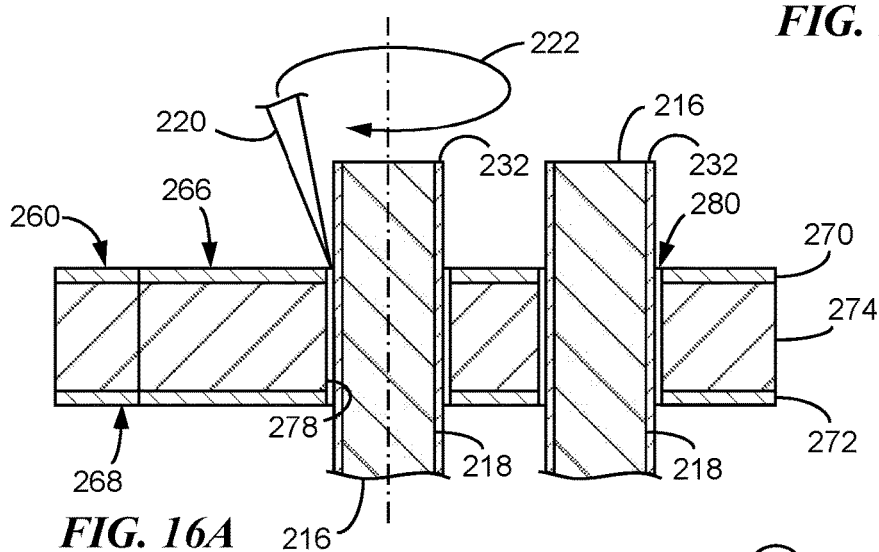
FIG. 16A
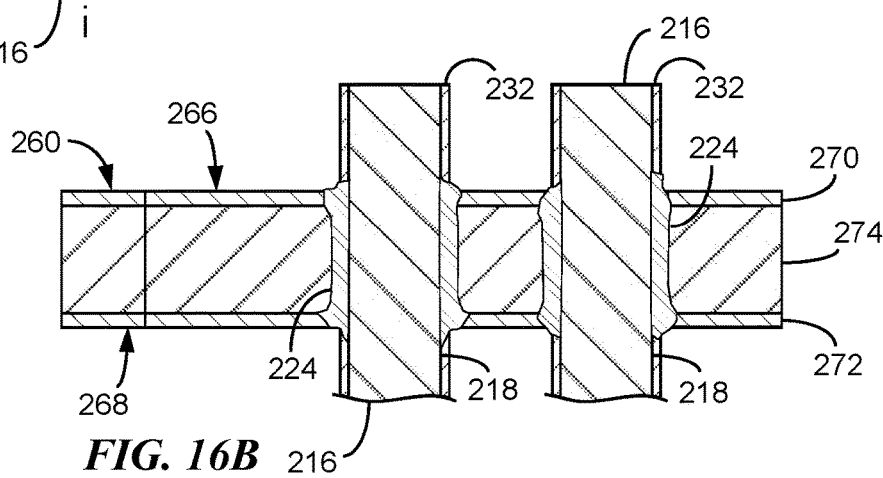
FIG. 16B

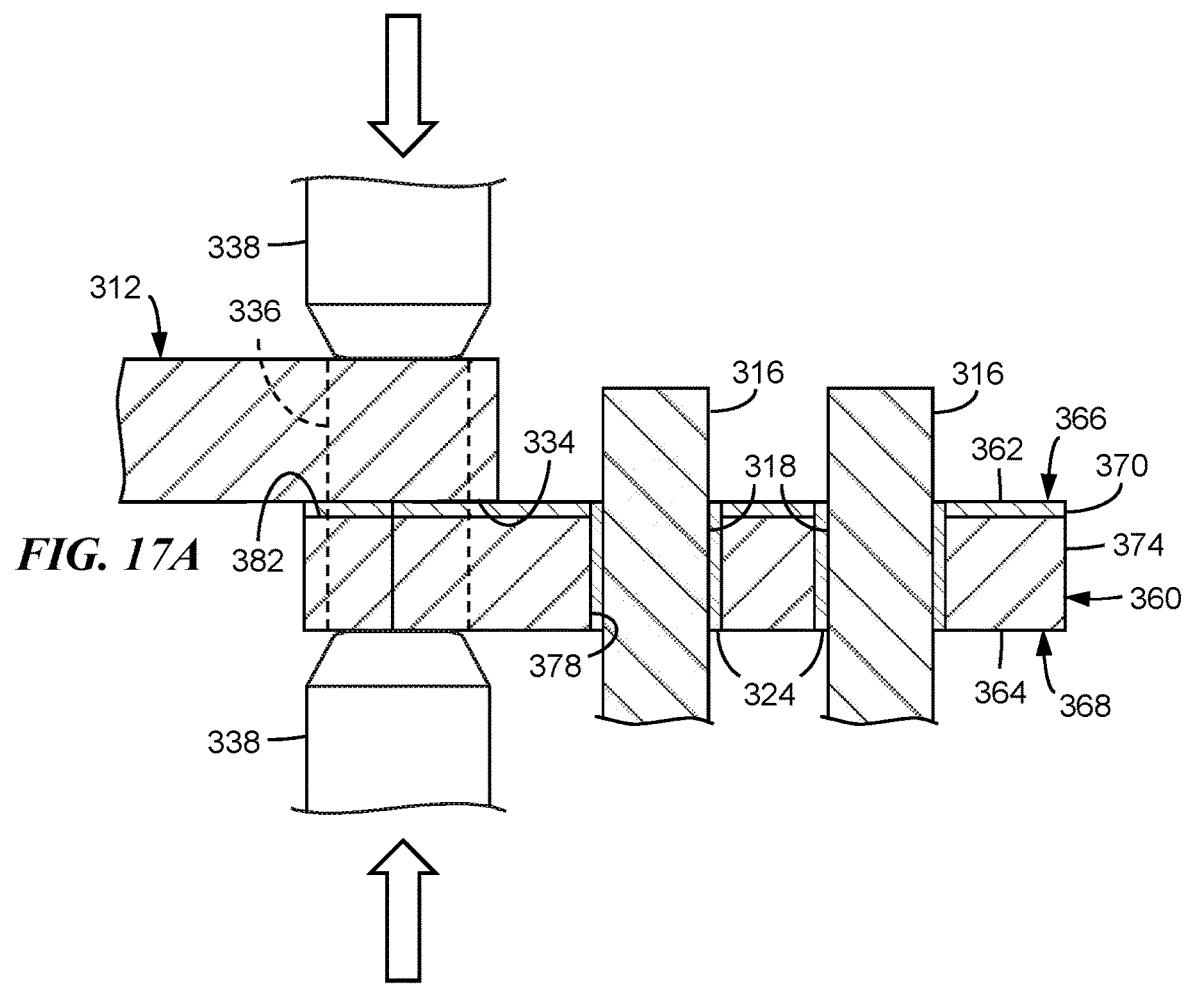
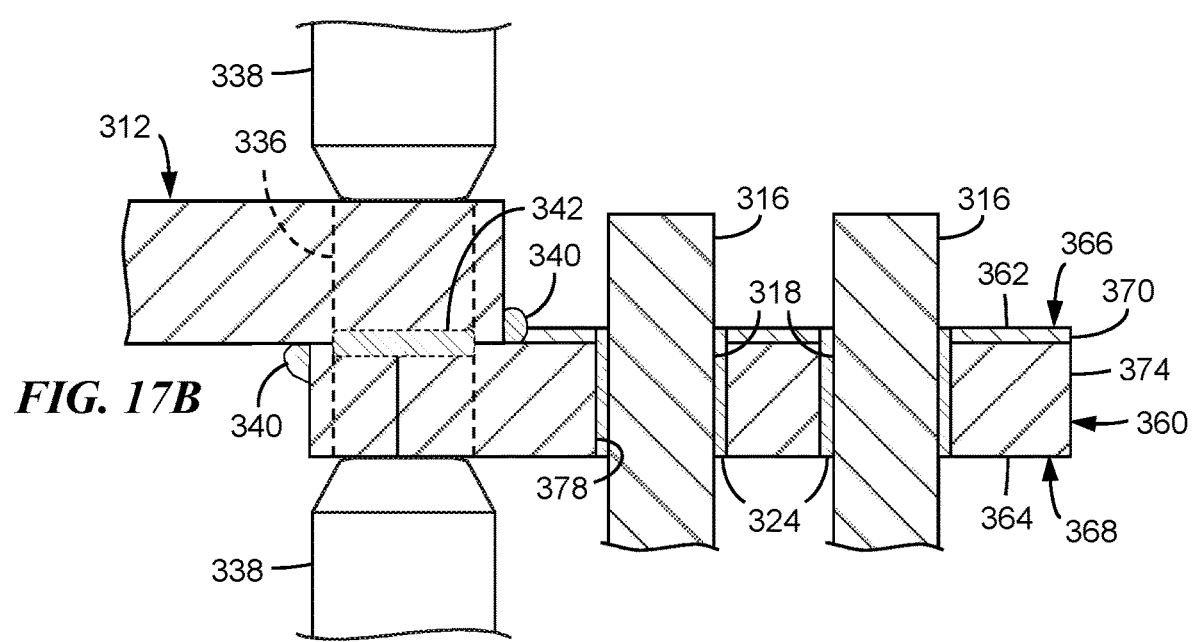

ELECTRICALLY CONDUCTIVE COPPER COMPONENTS AND JOINING PROCESSES THEREFOR

TECHNICAL FIELD

The present disclosure relates to copper components, copper joining processes, and more particularly to processes for joining copper components in which a metal or metal alloy is placed at or along joining surfaces of the copper components to facilitate the joining process.

INTRODUCTION

Electric devices typically include multiple interconnected electrically conductive metal components in combination with electrically insulating materials or components, which may be relatively heat-sensitive. In some instances, it may be desirable to assemble at least some of the metal components and the insulating components of an electric device prior to establishing mechanical and electrical connections between at least some of the metal components. In such case, it may be desirable to employ a low temperature joining process that will not result in thermal degradation of other nearby insulating materials or components or of the metal components themselves during the joining process.

Low temperature metal joining processes oftentimes involve the placement of a joining material between or adjacent to surfaces of the metal components to be joined. The joining material typically comprises a metal or metal alloy having a lower melting point than that of the metal components being joined. During the joining process, the joining material melts and bonds to the metal components without melting the components themselves. Thereafter, the joining material is allowed to solidify to form a solid joint between the metal components. Depending on the application, the joining material may be manually pre-placed on or adjacent to a joining surface of one or both of the metal components in the form of a strip, powder, paste, or preform shape having a desired volume. Or the joining material may be applied at or along the joining surfaces of the components during the joining process, for example, by melting or breaking off a desired volume of joining material at the joining site from a consumable wire, rod, coil, tape, or other extended volume of the joining material.

SUMMARY

According to one aspect of the present disclosure, a method of manufacturing electrically conductive copper components for an electric device is provided. An electrically conductive copper substrate having a first surface and an opposite second surface is provided. A surface treatment process is performed on the first surface of the substrate such that the first surface includes a plurality of peaks and valleys and exhibits a surface roughness (Rz) in the range of 10-100 µm. A first continuous coating of an electrically conductive joining material is deposited on the first surface of the substrate. In one form, the electrically conductive joining material may comprise a copper-based metal alloy and may be deposited on the first surface of the substrate via a cold spray process or a thermal spray process. In such case, the coating of the electrically conductive joining material may have a thickness in the range of 40 µm to 200 µm.

In one form, a surface treatment process also may be performed on the second surface of the substrate prior to depositing a second continuous coating of an electrically conductive joining material on the second surface of the substrate.

After the first continuous coating and optionally the second continuous coating of the electrically conductive joining material are respectively deposited on the first and second surfaces of the substrate, the substrate is formed into a plurality of electrically conductive copper components exhibiting a certain desired geometry. In one form, the electrically conductive copper substrate may comprise a sheet of copper or a copper-based alloy, and the plurality of electrically conductive copper components may be formed by cutting the substrate into a plurality of discrete pieces. Each of the plurality of electrically conductive copper components formed from the substrate includes a joining surface for establishing an electrical and mechanical connection with at least one other electrically conductive copper component, and a first preexisting coating of material is located on or adjacent to the joining surface of each of the plurality of electrically conductive copper components. If a second continuous coating of an electrically conductive joining material is also deposited on the second surface of the substrate prior to forming the substrate into the plurality of electrically conductive copper components, a second preexisting coating of material also will be located on or adjacent to the joining surface of each of the plurality of electrically conductive copper components.

In one form, the surface treatment process performed on the first surface of the substrate may comprise a process in which a pulsed laser beam is directed at the first surface of the substrate such that each pulse of the laser beam impinges the first surface of the substrate and removes a portion of the substrate along the first surface. The pulsed laser beam may be advanced relative to the first surface of the substrate during the surface treatment process in accordance with a predetermined scanning profile such that each pulse of the pulsed laser beam produces a spot on the first surface of the substrate that partially overlaps a previously or subsequently produced spot on the first surface of the substrate.

The plurality of electrically conductive copper components may comprise a plurality of electrically conductive copper tabs. Each of the copper tabs may include a first surface, an opposite second surface, and an inner joining surface that at least partially defines a through-hole extending from the first surface to the second surface thereof. In such case, the first preexisting coating of joining material is located on the first surface of each of the plurality of electrically conductive copper tabs.

According to another aspect of the present disclosure, a method of manufacturing electrically conductive copper components for an electric device is provided. A plurality of preformed electrically conductive copper components are provided, with each of the electrically conductive copper components having a joining surface for establishing an electrical and mechanical connection with another electrically conductive copper component. The plurality of preformed electrically conductive copper components are arranged such that the joining surfaces thereof are aligned with one another. In one form, the plurality of preformed electrically conductive copper components may be arranged such that at least a portion of each of the joining surfaces thereof faces the same direction. Thereafter, a continuous coating of an electrically conductive joining material is deposited on or adjacent the joining surface of each of the plurality of preformed electrically conductive copper components at substantially the same time.

In one form, the coating of the electrically conductive joining material may be deposited on or adjacent the joining surface of each of the plurality of preformed electrically conductive copper components via a cold spray process or a thermal spray process and may have a thickness in the range of 40 µm to 200 µm.

The joining surfaces of the plurality of preformed electrically conductive copper components may be substantially planar, or they may be non-planar or contoured in shape.

In one form, the plurality of preformed electrically conductive copper components may comprise a plurality of insulated copper wires having exposed terminal ends. In such case, the coating of the electrically conductive joining material may be deposited on the exposed terminal ends of the insulated copper wires via a cold spray process or a thermal spray process.

In another form, the plurality of preformed electrically conductive copper components may comprise a plurality of electrically conductive copper connectors having curved terminal ends. In such case, the coating of the electrically conductive joining material may be deposited on the curved terminal ends of the electrically conductive copper connectors via a cold spray process or a thermal spray process.

According to yet another aspect of the present disclosure, a method of joining electrically conductive copper components in a stator of an electric motor is provided. A first copper tab is provided that includes a first side, an opposite second side, a copper base having a first surface and an opposite second surface, a preexisting coating of joining material disposed on the first side of the first copper tab over the first surface of the copper base, and an inner joining surface that defines a through-hole extending through the first copper tab. An insulated copper wire also is provided having an exposed terminal end with an outer joining surface. The first copper tab and the insulated copper wire are positioned with respect to one another such that the terminal end of the copper wire extends through the through-hole defined by the inner joining surface of the first copper tab. Thereafter, a first portion of the coating of joining material disposed on the first side of the first copper tab is melted in a region surrounding the through-hole such that the joining material flows into the through-hole between the inner joining surface of the first copper tab and the outer joining surface of the terminal end of the copper wire. The joining material is allowed to solidify between the inner joining surface of the first copper tab and the outer joining surface of the terminal end of the copper wire to form a solid joint within the through-hole that extends from the first surface to the second surface of the copper base and joins the first copper tab and the copper wire together.

A second copper tab also may be provided that includes a first surface and an opposite second surface that respectively provide a first side and a second side of the second copper tab. The second copper tab may be positioned with respect to the first copper tab such that the first surface of the copper base and the second surface of the second copper tab confront one another and the second surface of the copper base and the first surface of the second copper tab face away from one another. The first and second copper tabs may be clamped between a pair of opposed and facially aligned welding electrodes at an intended joining site. An electric current may be passed between the welding electrodes and through the first and second copper tabs to melt a second portion of the coating of joining material disposed on the first side of the first copper tab between the first surface of the copper base and the second surface of the second copper tab. The first surface of the copper base and the second surface of the second copper tab may be brought into intimate contact with one another at the intended joining site by pressing a first one of the welding electrodes against the second side of the first copper tab and a second one of the welding electrodes against the first side of the second copper tab. Then, the passage of electric current may be stopped to form an electrically conductive bond between the first and second copper tabs at the intended joining site.

In one form, the preexisting coating of joining material disposed on the first side of the first copper tab may extend over an entire surface area of the first surface of the copper base and may have a thickness in the range of 40 µm to 200 µm.

BRIEF DESCRIPTION OF THE DRAWINGS

FIG. 6 is a schematic illustration of a process for depositing a coating of joining material on a surface of an electrically conductive copper substrate;

FIG. 7 is a schematic plan view of an electrically conductive copper substrate after a plurality of electrically conductive copper phase lead tabs have been formed therein;

FIG. 8 is a perspective view of one of the electrically conductive copper phase lead tabs shown in FIG. 7;

FIG. 9 is a perspective view of an electrically conductive copper layer jumper tab;

FIGS. 15A-15C schematically depict steps in a process for preparing a terminal portion of an insulated electrically conductive copper wire for a subsequent joining process;

FIGS. 16A-16B schematically depict steps in a process wherein coated terminal portions of two insulated electrically conductive copper wires are joined to an electrically conductive copper phase lead tab;

FIGS. 17A-17B schematically depict steps in a process wherein an upper electrically conductive copper phase lead tab is joined to a lower electrically conductive copper tab;

DETAILED DESCRIPTION

Electrically conductive copper components having preexisting coatings of joining material disposed on or adjacent to one or more joining surfaces thereof are formed according to a process in which (i) a continuous coating of joining material is deposited on a major surface of a substrate from which a plurality of individual copper components is subsequently formed, or (ii) a continuous coating of joining material is deposited on a plurality of aligned joining surfaces of a plurality of individual copper components at substantially the same time. The continuous coating of joining material may be deposited on planar surfaces as well as non-planar surfaces, and thus may be used to form preexisting coatings of joining material on a variety of different copper components exhibiting a variety of different shapes. The preexisting coatings of joining material disposed on or adjacent to the joining surfaces of the electrically conductive copper components allow the components to be joined to other electrically conductive copper components at a temperature well below the melting point of elemental copper, without having to manually pre-place or deposit a discrete volume of joining material on or adjacent to each of the copper components prior to or during a subsequent joining process. In some instances, it may be beneficial to abrade the surface of the substrate or the joining surfaces of the copper components prior to deposition of the continuous coating of joining material.

Figure 1:
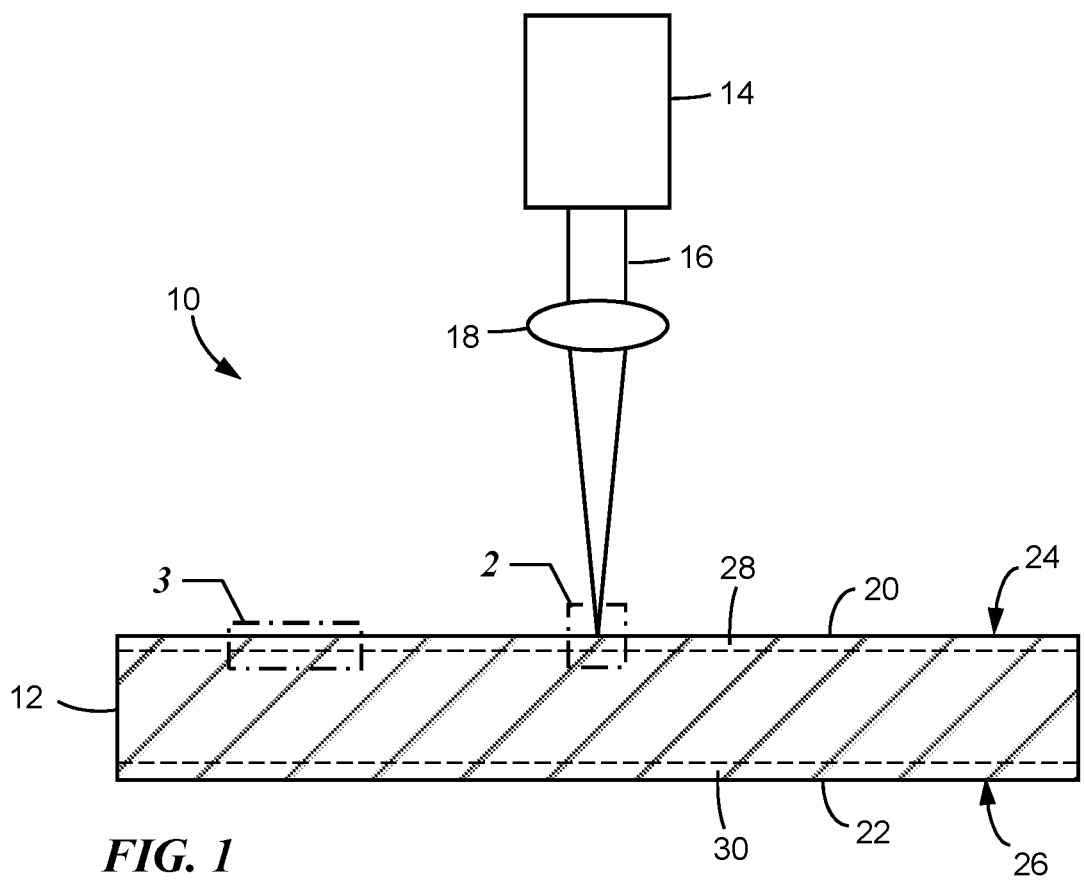
FIG. 1 is a schematic side view of an apparatus including a pulsed laser beam for preparing a surface of an electrically conductive copper substrate for the subsequent deposition of a coating of joining material.

FIG. 1 illustrates an apparatus 10 for preparing a surface of an electrically conductive copper substrate 12 for the subsequent deposition of a coating of joining material. The substrate 12 preferably comprises an electrically conductive copper-based material from which one or more electrically conductive components may be formed. For example, the substrate 12 may comprise a high copper-content alloy having greater than 96 percent copper by weight or about ninety-eight percent copper by weight or higher. In one form, the high copper-content alloy may include 0-4 wt % alloying elements, e.g., Cd, Cr, Zr, Mg, Fe, P, Be, Co, S, Te, and/or Pb. In one form, the substrate 12 may comprise Oxygen-Free High Conductivity (OFHC) copper, also known as Oxygen-Free Electronic (OFE) copper, which contains a minimum of 99.99 wt % copper and exhibits an electrical conductivity of 101% as determined by the International Annealed Copper Standard (IACS). In another form, the substrate 12 may comprise Electrolytic Tough Pitch (ETP) copper, which contains a minimum of 99.90 wt % copper and typically 0.04 wt % oxygen. ETP copper has a conductivity of 100-101.5% as determined by the IACS. In one form, the high copper-content alloy may have a conductivity of 100% as determined by the IACS.

The apparatus 10 includes a laser head 14 that generates a pulsed laser beam 16. During operation, the pulsed laser beam 16 is passed through an optical lens 18, which focuses the beam 16 on a desired surface portion of the substrate 12. The pulsed laser beam 16 may be a solid-state laser beam or a gas laser beam depending on the characteristics of the copper substrate 12 and the mode of operation. Some notable solid-state lasers that may be used are a fiber laser, a disk laser, a direct diode laser, and a Nd:YAG laser, and a notable gas laser that may be used is a $CO_2$ laser, although other types of lasers may certainly be used. If a solid-state laser is used, it may be operated with a wavelength in the near-infrared range (commonly considered to be 700 nm to 1400 nm) of the electromagnetic spectrum.

The electrically conductive copper substrate 12 comprises a first surface 20 and an opposite second surface 22 that respectively provide a first side 24 and a second side 26 of the substrate 12. The apparatus 10 may be used to prepare the first and/or second surfaces 20, 22 of the substrate 12 for the subsequent deposition of a coating of a joining material. For example, the apparatus 10 may be used to abrade the first and second surfaces 20, 22 of the substrate 12 by removing material from a first surface portion 28 on the first side 24 of the substrate 12 and/or from a second surface portion 30 on the second side 26 of the substrate 12.

Figure 2:
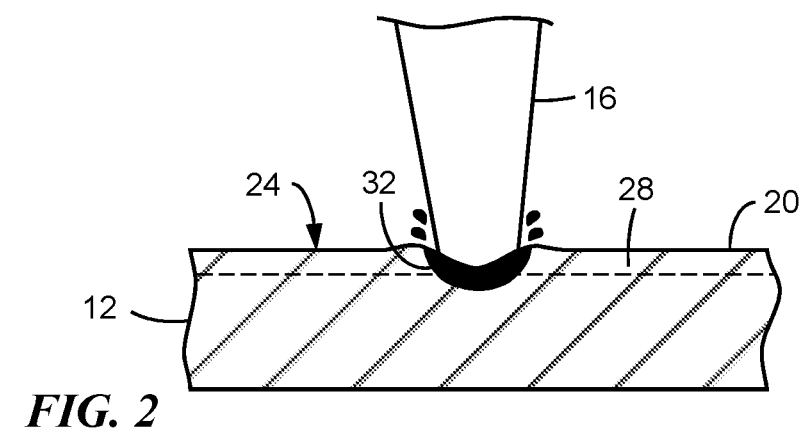
FIG. 2 is a magnified view of the pulsed laser beam and the surface of the substrate shown in FIG. 1 during the surface preparation process.

Referring now to FIG. 2, material may be removed from the first surface portion 28 on the first side 24 of the substrate 12 by a laser ablation process in which the pulsed laser beam 16 is directed at the first surface 20 of the substrate 12 such that the laser beam 16 impinges the first surface 20 the substrate 12. Heat generated at the point where the laser beam 16 meets the first surface 20 of the substrate 12 produces a three-dimensional pool of molten copper 32 within the substrate 12 that extends in a horizontal direction within the substrate 12 and in a vertical direction partway through the substrate 12, from the first surface 20 of the substrate 12 toward the second surface 22. Depending upon the power density of the laser beam 16, material may be removed from the first surface portion 28 of the substrate 12 by vaporizing the material and/or by ejecting the material from the pool of molten copper 32. Material optionally may be removed from the second surface portion 30 on the second side 26 of the substrate 12 prior to, during, or after a desired amount of material has been removed from the first surface portion 28 on the first side 24 of the substrate 12 and may be accomplished using substantially the same laser ablation process as described above with respect to the first surface portion 28 of the substrate 12.

The laser ablation process described above does not require direct physical contact with either of the surfaces 20, 22 to adequately abrade or roughen and thereby prepare the first and/or second surfaces 20, 22 for the subsequent deposition of a coating of joining material. As such, the laser ablation process described above may be performed without risk of contaminating the surfaces 20, 22 of the substrate 12 prior to joining. In addition, the laser ablation process can be effectively performed without heating the substrate 12 to a temperature at which undesirable chemical reactions (e.g., oxidation) may spontaneously occur on the surfaces 20, 22 of the substrate 12. In some embodiments, however, the first and/or second surfaces 20, 22 of the substrate 12 additionally or alternatively may be prepared for the subsequent deposition of a coating of joining material using a chemical and/or mechanical process in which physical contact is made with the first and/or second surfaces 20, 22 of the substrate 12 to abrade or roughen the surfaces 20, 22 of the substrate 12, for example, by removing material from the first and/or second surface portions 28, 30 of the substrate 12.

Figure 3:
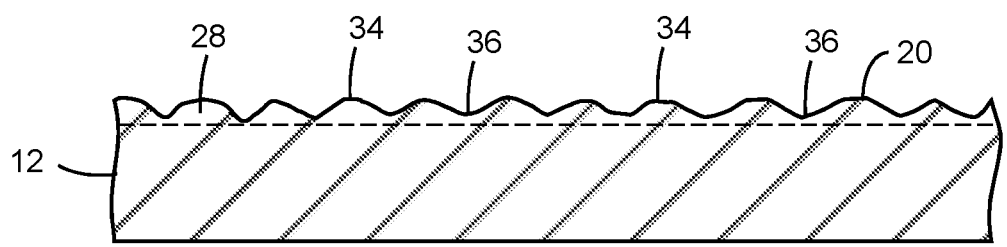
FIG. 3 is a magnified view of the surface of the substrate shown in FIG. 1 after performing the surface preparation process.

As shown in FIG. 3, the laser ablation process or other surface preparation processes may be performed such that the first and/or second surfaces 20, 22 of the substrate 12 include a plurality of peaks 34 and valleys 36. In one form, the first and/or second surfaces 20, 22 of the substrate 12 may exhibit a ten-point mean surface roughness (Rz) in the range of 10-100 μm, or more preferably in the range of 20-30 μm, prior to deposition of a coating of joining material thereon.

Figure 4:
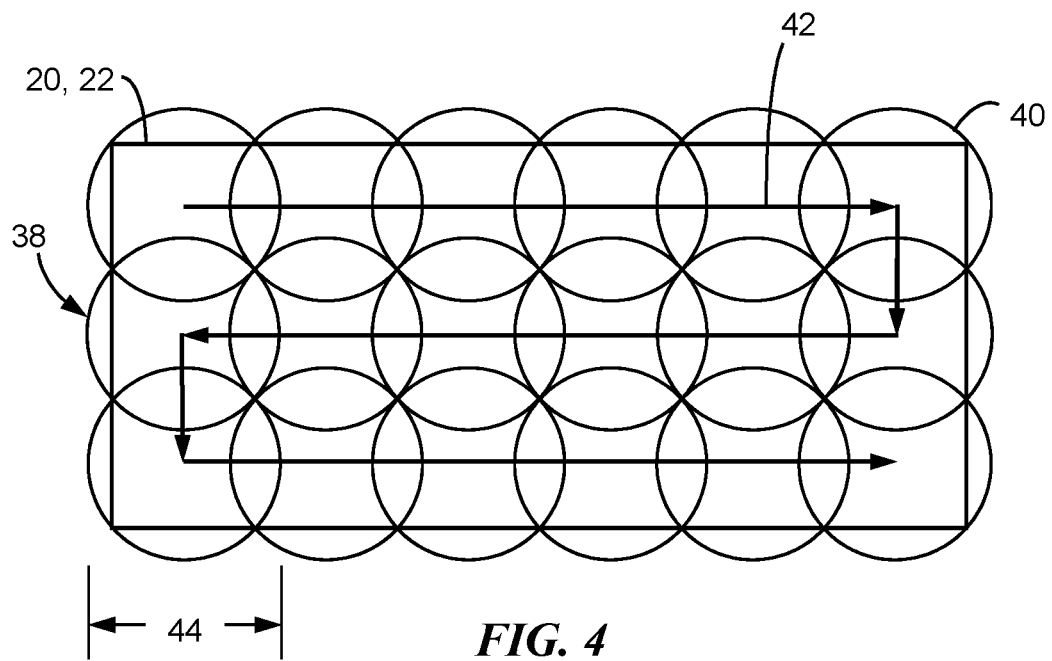
FIG. 4 is a schematic illustration of a path followed by a pulsed laser beam during a surface preparation process.

Referring now to FIG. 4, during the laser ablation process, the pulsed laser beam 16 repeatedly impinges upon the first and/or second surfaces 20, 22 of the substrate 12 as the laser beam 16 is advanced relative to the first and/or second surfaces 20, 22 in accordance with a predetermined scanning profile 38, with each pulse of the pulsed laser beam 16 in the profile 38 being depicted as a discrete spot 40. The scanning profile 38 shown in FIG. 4 may be achieved by controlling the laser beam 16 to track a predetermined path 42 on the first and/or second surfaces 20, 22 of the substrate 12, for example, by moving the laser head 16 relative to the substrate 12 and/or by moving the substrate 12 relative to the laser head 16. Depending upon the desired surfaces attributes, the area covered by each pulse (spot 40) of the pulsed laser beam 16 within the scanning profile 38 may or may not overlap the area covered by another pulse (spot 40) of the laser beam 16. The diameter 44 of the laser beam spots 40 also may be controlled or adjusted in accordance with the scanning profile 38. In one form, the diameter 44 of the laser beam spots 40 may be in the range of 50 μm to 100 μm, or more preferably about 70 μm.

In FIG. 4, the area covered by each pulse (spot 40) of the pulsed laser beam 16 in the scanning profile 38 partially overlaps at least one other previously and/or subsequently produced spot 40. In addition, the entire surface area of the first and/or second surfaces 20, 22 of the substrate 12 is exposed to at least one pulse of the pulsed laser beam 16. In other embodiments, the scanning profile 38 may be configured so that only a desired portion of the first and/or second surfaces 20, 22 of the substrate 12 are exposed to the pulsed laser beam 16, with the other remaining portions of the first and/or second surfaces 20, 22 being unaffected.

Figure 5:
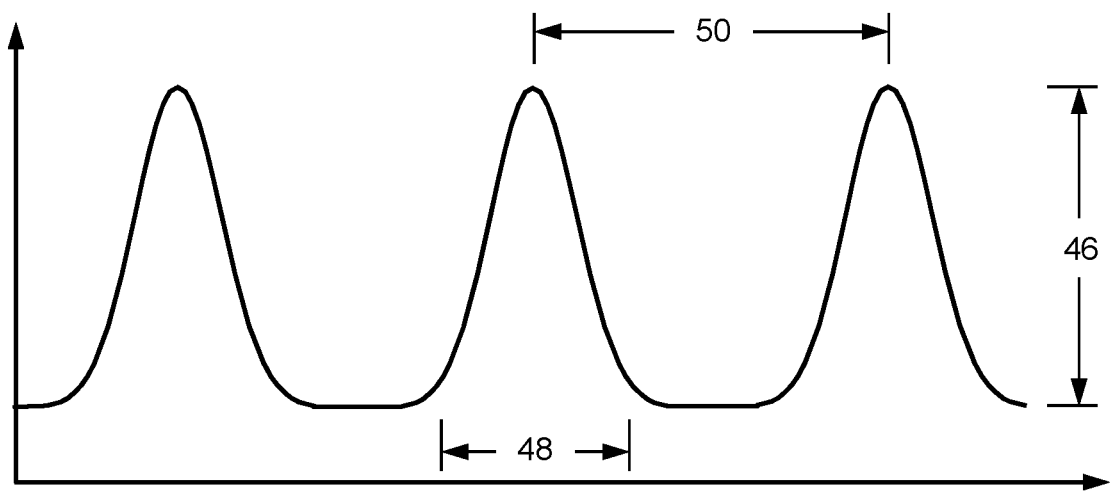
FIG. 5 is a chart of power density vs. time depicting an exemplary scanning profile of a pulsed laser beam during a surface preparation process.

Referring now to FIG. 5, in addition to the diameter of the laser beam spots 40, the power density 46, pulse duration 48, and frequency 50 of the pulses (spots 40), as well as the velocity of the laser beam 16 along the path 42 also may be controlled to achieve a desired scanning profile 38. The power density 46 of the laser beam 16 is preferably sufficient to vaporize and/or eject a desired amount of molten substrate 12 material from the first and second surface portions 28, 30 of the substrate 12 during the laser ablation process. In one form, the pulsed laser beam 16 may exhibit a power density 46 in the range of $1.0 \times 10^6$ W/cm$^2$ to $1.0 \times 10^7$ W/cm$^2$, or more preferably about $4.0 \times 10^6$ W/cm$^2$. The laser beam 16 may exhibit a pulse duration 48 in the range of 50-500 nanoseconds, a pulse frequency 50 in the range of 1-100 kHz, and a velocity in the range of 0.1-2 meters per second. In one form, the laser beam 16 may exhibit a pulse duration 48 of about 200 nanoseconds, a pulse frequency 50 of about 20 kHz, and a velocity of about 0.5 meters per second.

Referring now to FIG. 6, after the first and/or second surfaces 20, 22 of the electrically conductive copper substrate 12 have been suitably prepared, such as by the laser ablation process described above, a continuous coating of joining material may be deposited on the first and/or second surfaces 20, 22 of the substrate 12. In the embodiment depicted in FIG. 6, a first coating 52 of joining material is deposited on the first surface 20 of the substrate 12 and a second coating 54 of joining material is deposited on the second surface 22 of the substrate 12. In other embodiments, the first coating 52 or the second coating 54 may be omitted. The joining material deposited on the first and/or second surfaces 20, 22 of the substrate 12 may at least partially fill-in the valleys 36 on the first and/or second surfaces 20, 22 of the substrate 12. In one form, the joining material deposited on the first and/or second surfaces 20, 22 of the substrate 12 may entirely fill-in the valleys 36 on the first and/or second surfaces 20, 22 of the substrate 12 and also may extend over some or all of the peaks 34.

The joining material deposited on the first and/or second surfaces 20, 22 of the substrate 12 may be electrically conductive and may comprise a copper-based metal alloy having a melting point less than that of the substrate 12. For example, the copper-based metal alloy may have a melting point (or liquidus temperature) below the melting point of pure copper (about 1085° C.). Some suitable copper-based metal alloys comprise Cu—P alloys, Cu—P—Sn alloys, Cu—Ag—P alloys, and Cu—Sn—Si alloys. Suitable Cu—P alloys may comprise, by weight, 5-7.5% phosphorus (P) with copper (Cu) as balance. A low viscosity Cu—P alloy may comprise, by weight, 6.5-7.5% phosphorus (P) with copper (Cu) as balance. In one form, the joining material may comprise a Cu-based alloy that contains, by weight, about 7% phosphorus (P) and exhibits a melting temperature of about 710° C. Suitable Cu—Sn—Si alloys may comprise, by weight, 6% phosphorus (P), 6% tin (Sn), and 0.4% silicon (Si). Still another reactive metal composition for welding copper is an alloy of copper with, by weight, 15% silver, and 5% phosphorus. Suitable Cu—Ag—P alloys may comprise, by weight, 70-95% copper (Cu), 2-20% silver (Ag), and 3-8% phosphorus (P). Such a Cu—Ag—P alloy typically has a solidus temperature in the range of about 640° C. to 650° C. and a liquidus temperature in the range of about 640° C. to 820° C. In one form, the Cu—Ag—P alloy may include, by weight, 80% copper (Cu), 15% silver (Ag), and 5% phosphorous (P), and may exhibit a solidus temperature of about 644° C. and a liquidus temperature of about 805° C.

The first and/or second coatings 52, 54 may be deposited on the first and second surfaces 20, 22 of the substrate 12, for example, by a thermal spray or cold spray process, wherein micrometer-sized particles or droplets 56 of the joining material or a precursor thereof are ejected from a chamber 58 onto the first and second surfaces 20, 22 of the substrate 12.

In a gas dynamic spray or cold spray process, the first and/or second coatings 52, 54 of joining material are deposited on the first and/or second surfaces 20, 22 of the substrate 12 by accelerating solid powder particles of the joining material toward the substrate 12 such that the particles undergo plastic deformation upon impact and adhere to the first and/or second surfaces 20, 22 of the substrate 12. The solid particles are accelerated at very high velocities (200 m/s to 1,200 m/s) through a nozzle using a high-pressure compressed gas, such as nitrogen or helium. During the cold spray process, the joining material particles do not melt, but instead remain in solid phase throughout the deposition process. As such, the cold spray process does not result in oxidation or modification of the chemistry of the joining material during the deposition process. The high-impact stresses and strains between the joining material particles and the surfaces 20, 22 of the substrate 12 during the deposition process also may cause disruption of oxide films, thereby forming chemically-clean surfaces 20, 22 and generating high friction. Powders of the joining material used in the cold spray process may have average diameters in the range of 5-100 μm.

In a thermal spray process, a volume of the joining material is melted or softened prior to being sprayed at relatively low velocities (<150 m/s) onto the surfaces 20, 22 of the substrate 12 in the form of micrometer-sized particles or droplets, which flatten and rapidly solidify upon impact. The joining material supplied to the thermal spray process may be in the form of a powder, liquid, suspension, or wire. Some examples of suitable thermal spray processes include electric wire arc spraying, plasma spraying, flame spraying, and high velocity oxy-fuel (HVOF) or high velocity air fuel (HVAF) spraying.

The cold spray or thermal spray process used to deposit the first and/or second coatings 52, 54 on the substrate 12 may be controlled or adjusted to achieve a desired thickness of the coatings 52, 54. In one form, the first and/or second coatings 52, 54 may be formed on the substrate 12 by using a single spray pass to deposit a single layer of joining material on the first and/or second surfaces 20, 22 of the substrate 12. In another form, in order to achieve a desired thickness of the coatings 52, 54, multiple spray passes may be used to build up the coatings 52, 54 on the first and/or second surfaces 20, 22 of the substrate 12 by depositing multiple overlapping layers of joining material on the first and/or second surfaces 20, 22 of the substrate 12. In such case, after a first layer of joining material is deposited on the first and/or second surfaces 20, 22 of the substrate 12 a certain amount of time may be allowed to pass before a second layer of joining material is deposited on the substrate 12 over the first layer of joining material to allow the substrate 12 sufficient time to cool own between spray passes, which may help prevent oxidation of the surfaces 20, 22 of the substrate 12 during the deposition process. In one form, the coatings 52, 54 may have thicknesses in the range of 40 μm to 200 μm. For example, the coatings 52, 54 may have thicknesses of about 100 μm.

Referring now to FIGS. 7 and 8, after the first and/or second coatings 52, 54 of joining material are deposited on the first and/or second surfaces 20, 22 of the substrate 12, the coated substrate 12 may be formed into a plurality of electrically conductive copper pieces exhibiting a certain desired geometry (e.g., a desired size and shape). The plurality of electrically conductive copper pieces may be formed from the substrate 12, for example, by stamping, blanking, die cutting, punching, laser cutting, or perforating the substrate 12 into multiple pieces. In one form, the coated substrate 12 may be formed into a plurality of electrically conductive copper components for an electric device. Or the coated substrate 12 may be formed into a plurality of an intermediate structures, which may be subsequently formed into a plurality of electrically conductive components for an electric device. In FIG. 7, the substrate 12 comprises a metal sheet and is cut into a plurality of pieces, with each piece exhibiting the shape and size of an electrically conductive copper phase lead tab 60 (FIG. 8).

As shown in FIG. 8, the copper phase lead tab 60 formed from the coated substrate 12 includes a first surface 62 and an opposite second surface 64 that respectively provide a first side 66 and a second side 68 of the tab 60. A first preexisting coating 70 of joining material is located or disposed on the first side 66 of the tab 60 and a second preexisting coating 72 of joining material is located or disposed on the second side 68 of the tab 60, with an electrically conductive copper base 74 located or disposed therebetween. Because the coatings 52, 54 are formed over substantially the entire surface area of the first and/or second surfaces 20, 22 of the substrate 12 from which the tab 60 is made, the preexisting first and second coatings 70, 72 of joining material will generally extend over substantially the entire surface area of the first and second surfaces 62, 64 of the tab 60. In addition, the tab 60 has inner joining surfaces 78 that define a pair of through-holes 80 sized for receiving terminal ends of copper wires (not shown). In some embodiments, one or more outer joining surfaces 82 may be defined by a portion of the first and/or second surfaces 64, 64 on the first and/or second sides 66, 68 of the tab 60.

The preexisting first and second coatings 70, 72 of joining material can facilitate the subsequent low temperature formation of an electrical and mechanical joint between the tab 60 and one or more other electrically conductive copper components, without melting or thermally degrading the tab 60, the one or more other electrically conductive copper components being joined to the tab 60, or any other surrounding heat-sensitive components or materials. For example, when heated, the preexisting first and second coatings 70, 72 of joining material on the first and second sides 66, 68 of the tab 60 can facilitate the low temperature formation of an electrical and mechanical joint between one or both of the inner joining surfaces 78 of the tab 60 and one or more other electrically conductive copper components received within the holes 80 of the tab 60. As another example, when heated, the preexisting first and second coatings 70, 72 of joining material can facilitate the low temperature formation of an electrical and mechanical joint between the one or more outer joining surfaces 82 of the tab 60 and one or more other electrically conductive copper components having joining surfaces disposed in confronting relationship with the one or more outer joining surfaces 82 of the tab 60.

The preexisting first and second coatings 70, 72 of joining material can facilitate low temperature joining processes between the tab 60 and one or more other electrically conductive copper components, while also reducing material costs and the amount of time required to carry out the low temperature joining processes. This is because the thickness and volume of the coatings 70, 72 are relatively small, as compared to the thickness and/or volume of manually pre-placed solid joining materials and molten joining materials deposited during low temperature joining processes, which may have thicknesses of greater than 250 μm up to about 1.25 millimeters. In addition, because the thickness and volume of the coatings 70, 72 are relatively small, the amount of joining material ejected from the surface of the tab 60 during a subsequent joining process (sometimes referred to as "splatter") can be reduced or eliminated, as compared to joining process in which a relatively large volume of joining material is pre-placed or deposited on at an intended joining site. Furthermore, because the first and second coatings 70, 72 of joining material preexist on the tab 60, the tab 60 can be joined to one or more other electrically conductive copper components simply by heating the first and second coatings 70, 72 to a temperature at or above the melting point of the joining material, without having to manually pre-place a volume of solid joining material or having to deposit a volume of molten joining material at or adjacent to a desired joining surface of the tab 60 after formation thereof.

The preexisting first and second coatings 70, 72 may comprise a self-fluxing joining material. In such case, upon melting, the joining material can remove oxides and other contaminants from the joining surfaces 78, 82 of the tab 60 and from the confronting joining surfaces of one or more other electrically conductive copper components being joined to the tab 60. Also, the use of a self-fluxing joining material within the first and second coatings 70, 72 can help shield an intended joining site between the tab 60 and another electrically conductive copper component from atmospheric contamination, such as oxidation, during a subsequent joining process.

In some embodiments, the joining material of the preexisting first and second coatings 70, 72 may comprise a reaction material that, when melted, is reactive with the joining surfaces 78, 82 of the tab 60 and the joining surfaces of the other electrically conductive copper components that will subsequently be joined to the tab 60. In addition, the reaction material may be formulated with a melting point below the melting point of the electrically conductive copper base 74 and of the other electrically conductive copper components to be joined to the tab 60. The exact composition of the reaction material thus depends on the composition of the electrically conductive copper base 74 and of the other electrically conductive copper components.

As shown in FIG. 9, in one form, the substrate 12 may comprise a metal sheet and may be cut into a plurality of pieces, with each piece exhibiting the shape and size of an electrically conductive copper layer jumper tab 60'. Like the phase lead tab 60, the layer jumper tab 60' includes a first surface 62' and an opposite second surface 64' that respectively provide a first side 66' and a second side 68' of the tab 60'. A first preexisting coating 70' of joining material is disposed on the first side 66' of the tab 60' and a second preexisting coating 72' of joining material is disposed on the second side 68' of the tab 60', with an electrically conductive copper base 74' disposed therebetween. The tab 60' also includes inner joining surfaces 78' that define a pair of through-holes 80' sized for receiving terminal ends of copper wires (not shown).

Figure 10:
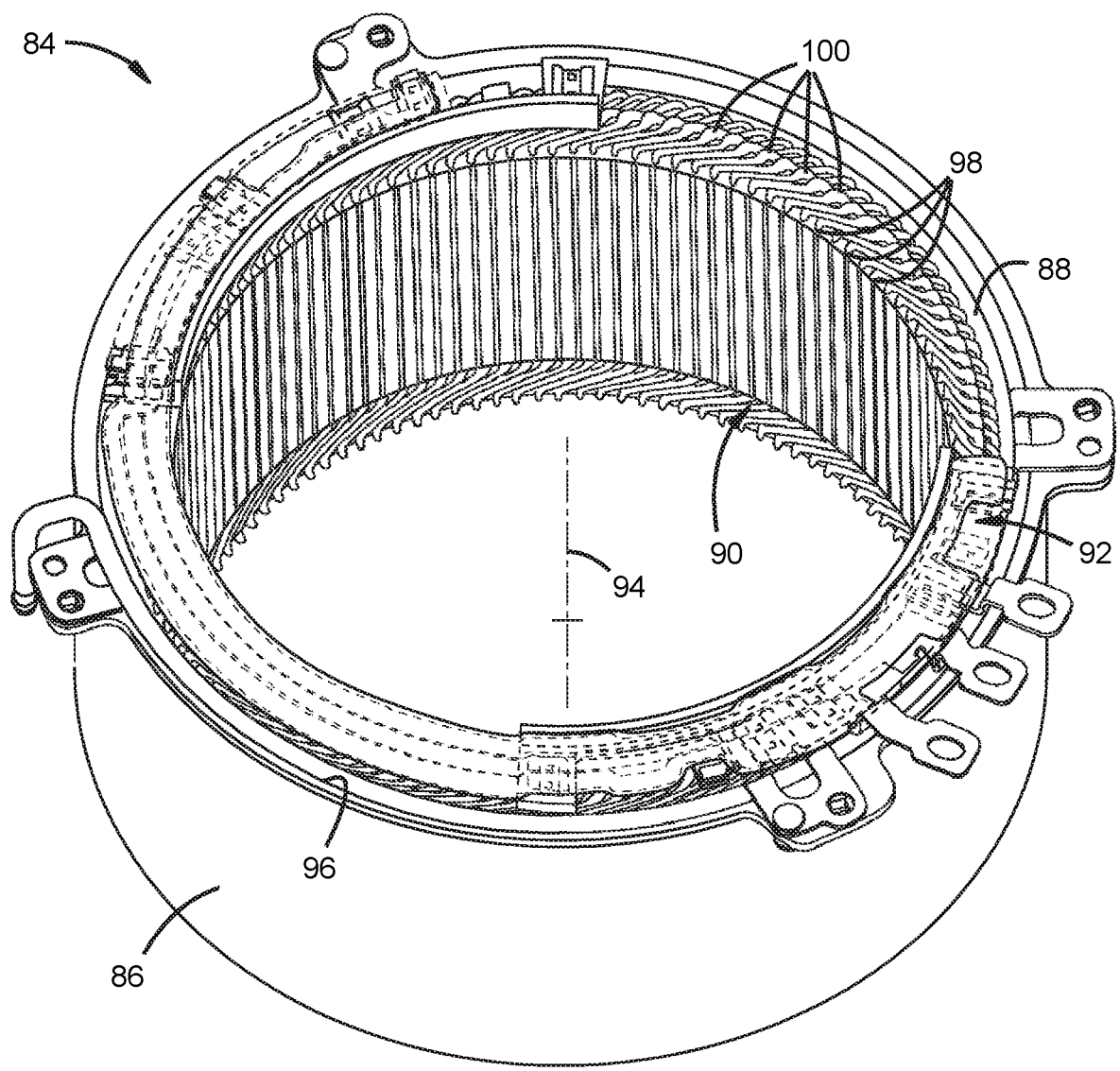
FIG. 10 is a perspective view of an electric motor stator for an automobile application including a cylindrical housing, a ferromagnetic stator core, an electromagnetic polyphase stator winding, and a connection ring.
Figure 11:
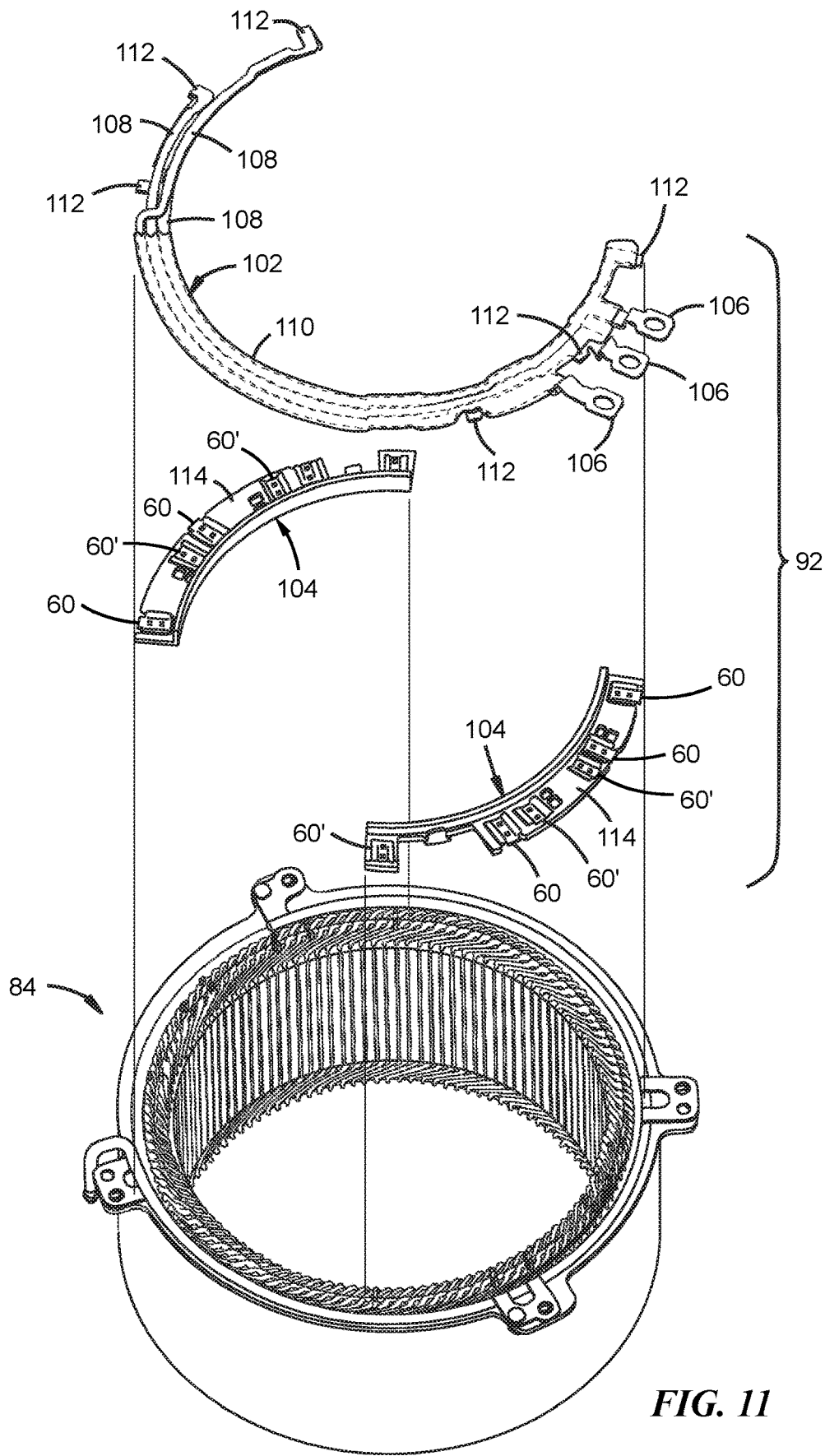
FIG. 11 is an exploded perspective view of the electric motor stator shown in FIG. 10.
Figure 12:
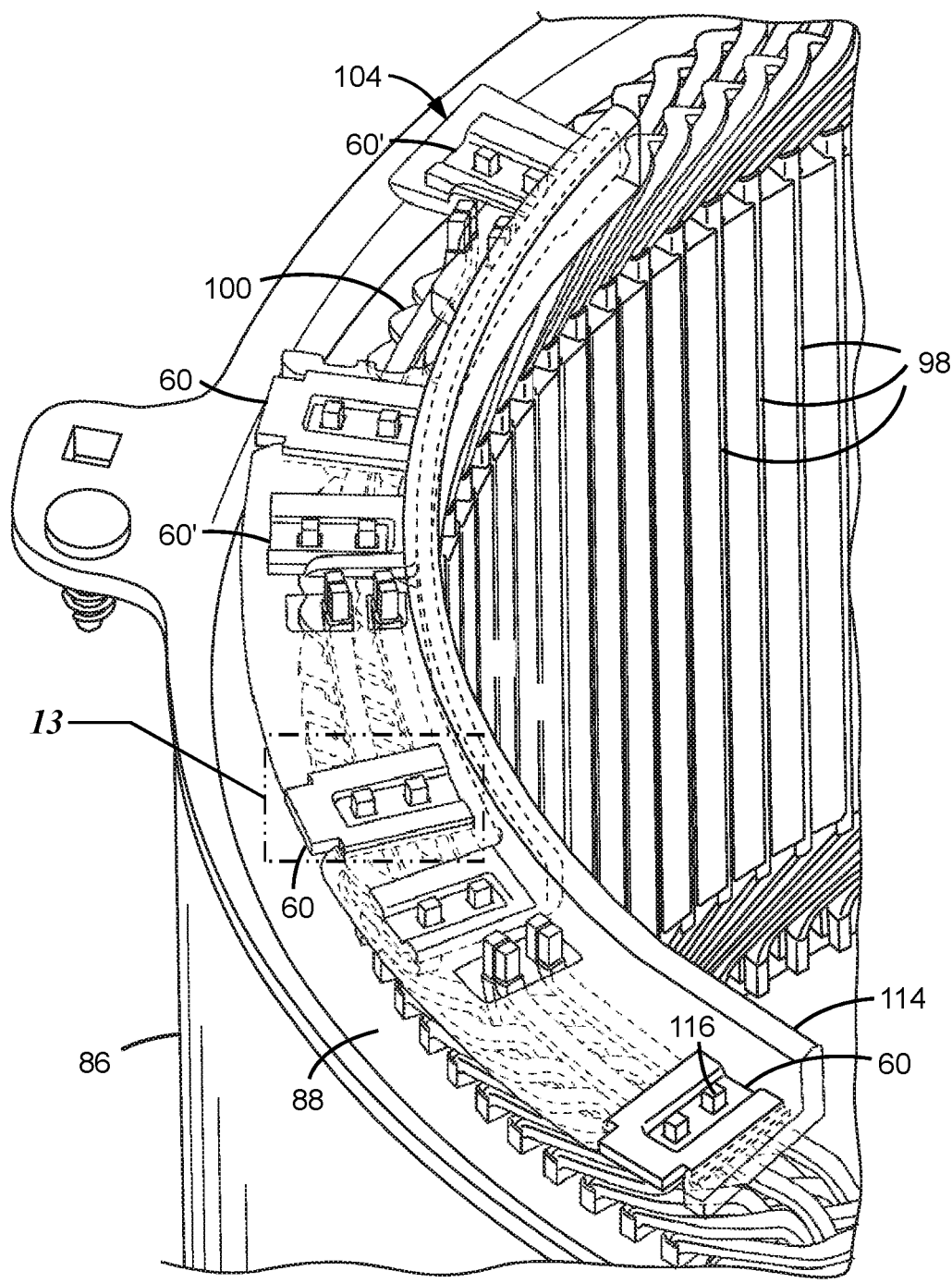
FIG. 12 is a magnified perspective view of a lower carrier ring of the connection ring shown in FIG. 11 disposed on the electromagnetic polyphase stator winding.

In one form, the copper tabs 60, 60' may comprise electrically conductive components of a stator 84 of a 3-phase AC automobile electric motor, as shown in FIGS. 10, 11, and 12. The stator 84 may include a cylindrical housing 86, a ferromagnetic stator core 88, an electromagnetic polyphase stator winding 90, and a connection ring 92. The housing 86 has a central axis 94 and functions to support and protect the stator core 88 and the stator winding 90 and to provide overall mechanical strength to the stator 84. The ferromagnetic stator core 88 is disposed along an inner circumferential wall 96 of the housing 86. The stator core 88 may be constructed of axially-stacked insulated laminations of a ferromagnetic material that define a plurality of axially-extending slots 98 circumferentially-spaced around the stator axis 94.

The electromagnetic polyphase stator winding 90 includes multiple distinct phase windings comprised of copper wires 100 that, here, are in the form of rectangular-sectioned copper bars. The copper wires 100 of each phase winding are wound through the multiple slots 98 of the stator core 88 in a way that establishes one or more pairs of opposed magnetic poles when an electrical current is delivered to that particular phase winding. The multiple phase windings, in turn, are alternately arranged around the stator core 88 so that electric current can be delivered to the different phase windings in a rotating three-phase progression, which causes the stator winding 90 to generate a rotating magnetic field that is amplified by the stator core 88. In order to keep the copper wires 100 of the distinct phase windings from short-circuiting one another, especially in an automobile electric motor, an enamel coating is typically applied to the outer surface of the copper wires 100 and a polymer or paper insulation material is disposed between the copper wires 100 and the stator core 88 within the slots 98.

The connection ring 92 facilitates delivery of electric current to the electromagnetic polyphase stator winding 90. As shown best in FIGS. 11 and 12, the connection ring 92 includes an upper carrier ring 102 and two lower carrier rings 104. The upper carrier ring 102 has three phase leads 106 that are electrically connectable to a power source. The phase leads 106 are respectively coupled to three copper conductor bands 108. The conductor bands 108 are housed side-by-side within and extending through an upper insulating body 110 (partially broken away). Three upper phase lead tabs 112 respectively associated with the three copper conductor bands 108 extend outward from the upper insulating body 110 and are hence exposed. A plurality of the copper tabs 60, 60' are incorporated into the stator 84 by being held within lower insulating bodies 114 of the two lower carrier rings 104. The phase lead tabs 60 may be arranged within the stator 84 such that the joining ends 76 of the phase lead tabs 60 confront and are joined to the upper phase lead tabs 112 of the upper carrier ring 102. In this way, electrical current can be delivered by the three phase leads 106, through the copper conductor bands 108 and the joined upper phase lead tabs 112 and lower phase lead tabs 60, and to the several distinct phase windings of the stator winding 90 in a rotating three-phase progression.

Figure 13:
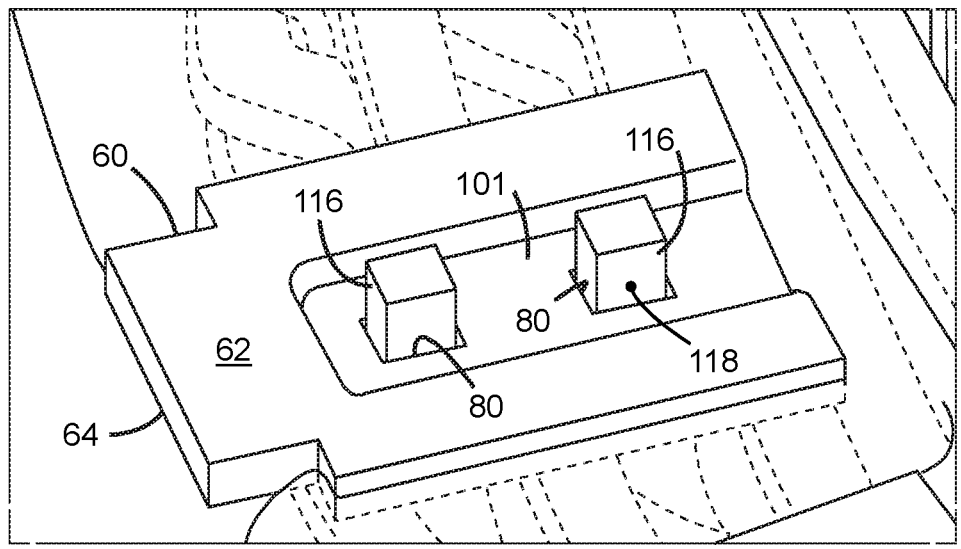
FIG. 13 is a magnified perspective view of a copper phase lead tab held within an insulating body of the lower carrier ring shown in FIG. 12.

As best shown in FIGS. 12 and 13, when the lower carrier ring 104 is located on the stator winding 90, terminal ends 116 of the copper wires 100 are received by and extend through the through-holes 80, 80' of the tabs 60, 60' such that outer joining surfaces 118 of the wires 100 are in opposed facing relationship with the inner joining surfaces 78, 78' of the tabs 60, 60'. The copper wires 100 associated with each of the copper tabs 60, 60' need to be joined in place to their respective copper tabs 60, 60' to electrically connect the several phase windings to their intended phase leads 106. This can be accomplished by a joining process in which a relatively low amount of heat is applied to the tabs 60, 60' to melt the joining material within the first and second preexisting coatings 70, 70', 72, 72' on the first and second sides 62, 62', 64, 64' of the tabs, without thermally degrading the tabs 60, 60', the wires 100, or other nearby electrically-insulating materials to an operationally unacceptable extent.

In the embodiments depicted in FIGS. 8 and 9, the first and second surfaces 62, 62', 64, 64' of the respective tabs 60, 60' are substantially flat. However, in some instances, it may be desirable to provide the tabs 60, 60' with contoured surfaces. For example, as shown in FIG. 13, in some instances it may be desirable to form a recess or depressed well 101 in the first side 66 of the tab 60. In such case, a plurality of recessed regions (not shown) exhibiting the shape of the depressed well 101 may be formed in the first side 25 of the substrate 12 prior to or after deposition of the coatings 52, 54. Thereafter, a plurality of individual tabs 60 may be formed from the coated substrate 12, with each tab 60 having a depressed well 101 formed in a first side 66 thereof. In embodiments where the coatings 52, 54 are formed from a relatively brittle joining material, it may be desirable to form any desired surface contours, such as any recessed regions, in the substrate 12 prior to deposition of the coatings 52, 54.

Figure 14A:
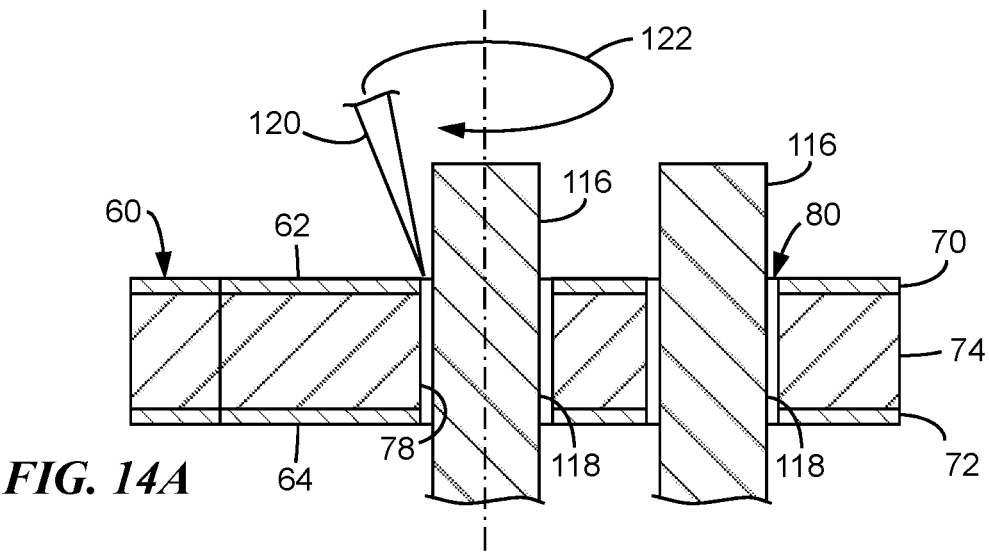
FIGS. 14A-14B schematically depict steps in a process wherein terminal portions of two insulated electrically conductive copper wires are joined to the electrically conductive copper phase lead tab shown in FIG. 13.
Figure 14B:
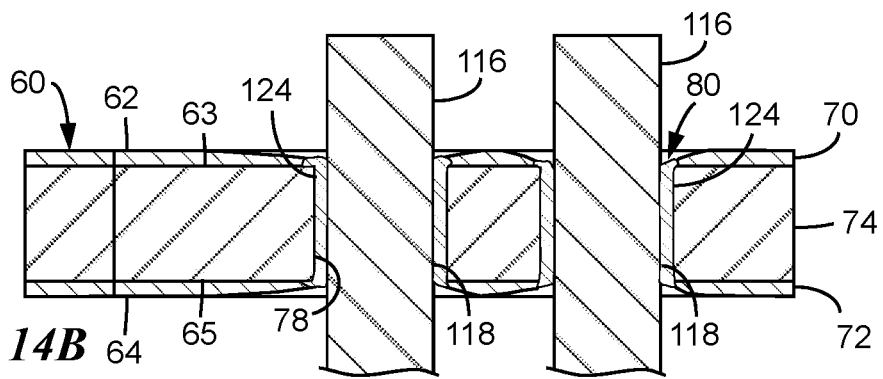

Referring now to FIGS. 14A and 14B, after the terminal ends 116 of the copper wires 100 are received within the through-holes 80 of the tab 60 and the inner joining surfaces 78 of the tab 60 are in opposed facing relationship with the outer joining surfaces 118 of the terminal ends 116 of the wires 100, heat is applied to the first and/or second surfaces 62, 64 of the tab 60 within a region surrounding the through-holes 80. A sufficient amount of heat is applied to the first and/or second surfaces 62, 64 of the tab 60 to melt the joining material within the first and second coatings 70, 72 around each of the through-holes 80, without melting the electrically-conductive copper base 74. For example, a sufficient amount of heat may be applied to the first and/or second surfaces 62, 64 of the tab 60 to raise the temperature of the first and second coatings 70, 72 to between 600° C. and 900° C. Heat may be applied to the first and/or second surfaces 62, 64 of the tab 60 by any suitable method, such as by directing a laser beam 120 at multiple points on the first and/or second surfaces 62, 64 of the tab 60 within one or more regions surrounding each of the through-holes 80.

As shown in FIG. 14A, heat may be applied to the first and/or second surfaces 62, 64 of the tab 60 by directing the laser beam 120 to follow a circumnavigating path 122 around each of the through-holes 80. As the joining material within the first and second coatings 70, 72 melts, the joining material flows, e.g., by capillary action, into the through-holes 80 and fills the space between the inner joining surfaces 78 of the tab 60 and the outer joining surfaces 118 of the terminal ends 116. Once the applied heat stops, the joining material is rapidly quenched and begins to solidify, with the heat contained in the joining material dissipating into the surrounding tab 60. After the joining material is fully solidified, solid joints 124 remain within the through-holes 80 that electrically and mechanically join the wires 100 and the tab 60 together via the formation of a continuous metallurgical bond therebetween. As depicted in FIG. 14B, the solid joints 124 may extend from a first surface 63 to an opposite second surface 65 of the copper base 74, around the terminal ends 116 of the wires 100. Because the tab 60 is fabricated with preexisting coatings 70, 72 of joining material on its first and second sides 66, 68, the terminal ends 116 of the copper wires 100 may be joined to the tab 60 using a relatively low temperature joining process without having to pre-place or otherwise deposit a volume of joining material on the tab 60 or the wires 100 prior to or during the joining process. This reduces the time and expense required to perform the joining process and also increases process reliability by reducing the complexity and the number of steps in the joining process.

Referring now to FIGS. 15A, 15B, and 15C, in some instances, the copper wires 100 may be manufactured to include a coating of joining material disposed on their terminal ends 116. First, an insulated copper wire 100 having a copper core 126 is provided, as depicted in FIG. 15A. Then, the insulation is stripped off a distal end 128 of the wire 100 to expose the copper core 126, which forms the terminal end 116 of the wire 100, as shown in FIG. 15B. Next, a plurality of the insulated copper wires 100 having exposed terminal ends 116 are arranged side-by-side and a cover or shield 130 is placed over the remaining insulated portion of the wires 100, as shown in FIG. 15C. The insulated copper wires 100 may be arranged so that the terminal ends 116 of the wires 100 are aligned with one another. In addition, the terminal ends 116 of the wires 100 may be aligned such that at least one surface on the terminal end 116 of one of the wires 100 faces in substantially the same direction as at least one surface on the terminal end 116 of each of the remaining wires 100. Aligning the terminal ends 116 of the wires in this way may allow a coating of joining material to be formed on all of the like-facing surfaces of the terminal ends 116 at substantially the same time.

After the insulated copper wires 100 are suitably arranged with respect to one another, a coating of joining material may be selectively deposited on the terminal ends 116 of the wires 100, as shown in FIG. 15C. In some instances, the terminal ends 116 of the wires 100 may need to be rotated or "flipped over" during the coating process so that the coating of joining material can be deposited on multiple surfaces or sides of the terminal ends 116 of the wires 100. The joining material deposited on the terminal ends 116 of the wires 100 may be the same as the joining material deposited on the first and second surfaces 20, 22 of the substrate 12 and may be deposited using the same cold spray or thermal spray deposition techniques, wherein particles or droplets 56 of the joining material or a precursor thereof are ejected from a chamber 58 onto the terminal ends 116 of the wires 100.

In some instances, the insulation stripping process may be sufficient to prepare the surface of the terminal end 116 of the wire 100 for the subsequent deposition of the joining material coating. In other instances, the surface of the terminal end 116 of the wire 100 may need to be treated to sufficiently roughen or abrade the surface prior to deposition of the joining material coating. In such case, material may be removed from the surface of the terminal end 116 of the wire 100, for example, using the same laser ablation process performed on the first and/or second surfaces 20, 22 of the substrate 12, or using any other process capable of producing a suitably rough surface on the terminal end 116 of the wire 100.

Referring now to FIGS. 16A and 16B, a copper tab 260—having a first preexisting coating 270 of joining material disposed on a first side 266, a second preexisting coating 272 of joining material disposed on a second side 268, and an electrically conductive copper base 274 disposed therebetween—may be electrically and mechanically joined to a pair of copper wire terminals ends 216 that include a preexisting coating 232 of joining material disposed on outer joining surfaces 218 thereof. Like the embodiment discussed above with respect to FIGS. 14A and 14B, the terminal ends 216 are received within through-holes 280 of the tab 260 such that inner joining surfaces 278 of the tab 260 are in opposed facing relationship with the outer joining surfaces 218 of the terminal ends 216. Thereafter, heat is applied to the first and/or second sides 266, 268 of the tab 260 within a region surrounding the through-holes 280 and/or to the outer joining surfaces 218 of the terminal ends 216 to melt the joining material within the coatings 270, 272, 232, without melting the electrically conductive copper base 274. Molten joining material from the coatings 270, 272, 232 flows between and fills in the space between the inner joining surfaces 278 of the tab 260 and the outer joining surfaces 218 of the terminal ends 216. Once the applied heat stops, the joining material solidifies and forms two solid joints 224 between the inner joining surfaces 278 of the tab 260 and the outer joining surfaces 218 of the terminal ends 216, which electrically and mechanically join the terminal ends 216 and the tab 260 together via the formation of a continuous metallurgical bond therebetween. As discussed above with respect to FIGS. 14A and 14B, heat may be applied to the tab 60 and/or to the terminal ends 216 by any suitable method, such as by directing a laser beam 220 at multiple points on the first and/or second sides 266, 268 of the tab 260 within one or more regions surrounding each of the through-holes 280. For example, as shown in FIG. 16A, heat may be applied to the first and/or second sides 266, 268 of the tab 260 by directing the laser beam 220 to follow a circumnavigating path 222 around each of the through-holes 280.

In some instances, one or more copper wires having terminal ends with a coating of joining material formed on an outer joining surface thereof may be joined to one or more other uncoated electrically conductive copper components that do not have a coating of joining material formed thereon, such as an uncoated phase lead tab or an uncoated terminal end of another copper wire. In such case, the outer joining surfaces of the coated terminal ends may be placed in confronting relationship with the joining surface of the uncoated electrically conductive copper component and joined thereto by heating the coating of joining material on the terminal ends of the copper wires to a temperature at or above the melting point of the joining material, without melting or thermally degrading the terminal ends of the copper wires, the other uncoated electrically conductive copper components, or any surrounding materials or components.

Referring now to FIGS. 17A and 17B, in some embodiments, an electrically conductive copper lower phase lead tab 360 for a stator 84 of a 3-phase AC automobile electric motor may include a first surface 362, an opposite second surface 364, and inner joining surfaces 378 that define a pair of through-holes 380 sized for receiving a pair of copper wire terminal ends 316 having outer joining surfaces 318. The first and second surfaces 362, 364 of the tab 360 respectively provide a first side 366 and a second side 368 of the tab 360. The lower phase lead tab 360 comprises an electrically conductive copper base 374 having a preexisting coating 370 of joining material disposed on the first side 366 thereof. The second side 368 of the tab 360 may be coated or uncoated. Like the phase lead tab 60 depicted in FIG. 8, the tab 360 may be formed (along with one or more other electrically conductive components) from an electrically conductive copper substrate having a coating of joining material deposited on at least one major surface thereof, and the preexisting coating 370 of joining material may extend over substantially the entire surface area of the first surface 362 of the tab 360. The lower phase lead tab 360 may be electrically and mechanically joined to the pair of copper wire terminal ends 316 extending therethrough by melting the joining material within the preexisting coating 370 such that the joining material flows into the through-holes 380 and fills the space between the inner joining surfaces 378 of the tab 360 and the outer joining surfaces 318 of the terminal ends 316. After the heat is stopped and the joining material has fully solidified, two solid joints 324 will remain within the through-holes 380 of the tab 360 around the outer joining surfaces 318 of the terminal ends 316 that will electrically and mechanically join the terminal ends 316 to the tab 360 via the formation of a continuous metallurgical bond therebetween.

In addition, the lower phase lead tab 360 may be electrically and mechanically joined to an upper phase lead tab 312. More specifically, an outer joining surface 382 of the copper base 374 of the upper phase lead tab 360 may be electrically and mechanically joined to an outer joining surface 334 of the upper phase lead tab 312, for example, using a reaction metallurgical joining process. In such case, the joining material coating 370 disposed on the first side 366 of the lower phase lead tab 360 may comprise a copper alloy material that can form a mobile liquid phase through reaction with a small amount of the material of the copper base 374 and of the upper phase lead tab 312 under the influence of applied heat. The mobile liquid phase formed during the joining process preferably has a melting point lower than that of the copper base 374 and of the upper phase lead tab 312. The joining material coating 370 also may be formulated to remove any undesirable non-copper materials, e.g., any oxide films, initially present on the outer joining surface 334 of the upper phase lead tab 312.

Prior to joining, the upper phase lead tab 312 and the lower phase lead tab 360 are arranged such that the outer joining surface 382 of the copper base 374 and the outer joining surface 334 of the upper phase lead tab 360 are disposed in confronting relationship with one another at an intended joining site 336. During the joining process, a pair of opposing welding electrodes 338 are pressed against opposite sides of the upper phase lead tab 112 and the lower phase lead tab 360 and an electric current is passed through the upper and lower phase lead tabs 112, 360 and through their respective joining surfaces 334, 382, which causes a portion of the joining material coating 370 to melt at the joining site 336, to react with the material of the copper base 374 and of the upper phase lead tab 112, and to flux any undesirable non-copper materials from the joining surfaces 334, 382 thereof. Pressure is continuously applied to the opposite sides of the upper phase lead tab 112 and the lower phase lead tab 360 by the welding electrodes 338 during the joining process, which brings the joining surfaces 334, 382 of the upper and lower phase lead tabs 112, 360 together into intimate contact. At the same time, by-products of the reaction between the joining material coating 370 and the upper and lower phase lead tabs 112, 360 are expelled from the interface between the tabs 112, 360 and accumulate as by-product bodies 340 at the edges of the joining surfaces 334, 382, as shown in FIG. 17B. Once the electric current is stopped, the by-product bodies 340 solidify at the edges of the joining surfaces 334, 382 and a continuous electrically conductive metallurgical bond 342 is formed between the upper and lower phase lead tabs 112, 360 at the joining site 336. As depicted in FIG. 17B, the preexisting coating 370 of joining material disposed on the first side 366 of the tab 360 can facilitate the formation of multiple mechanical and electrical connections/joints between the tab 360 and one or more other electrically conductive copper components, without having to individually deposit multiple discrete volumes of joining material on the tab 360 prior to the formation of each individual joint.

Figure 18:
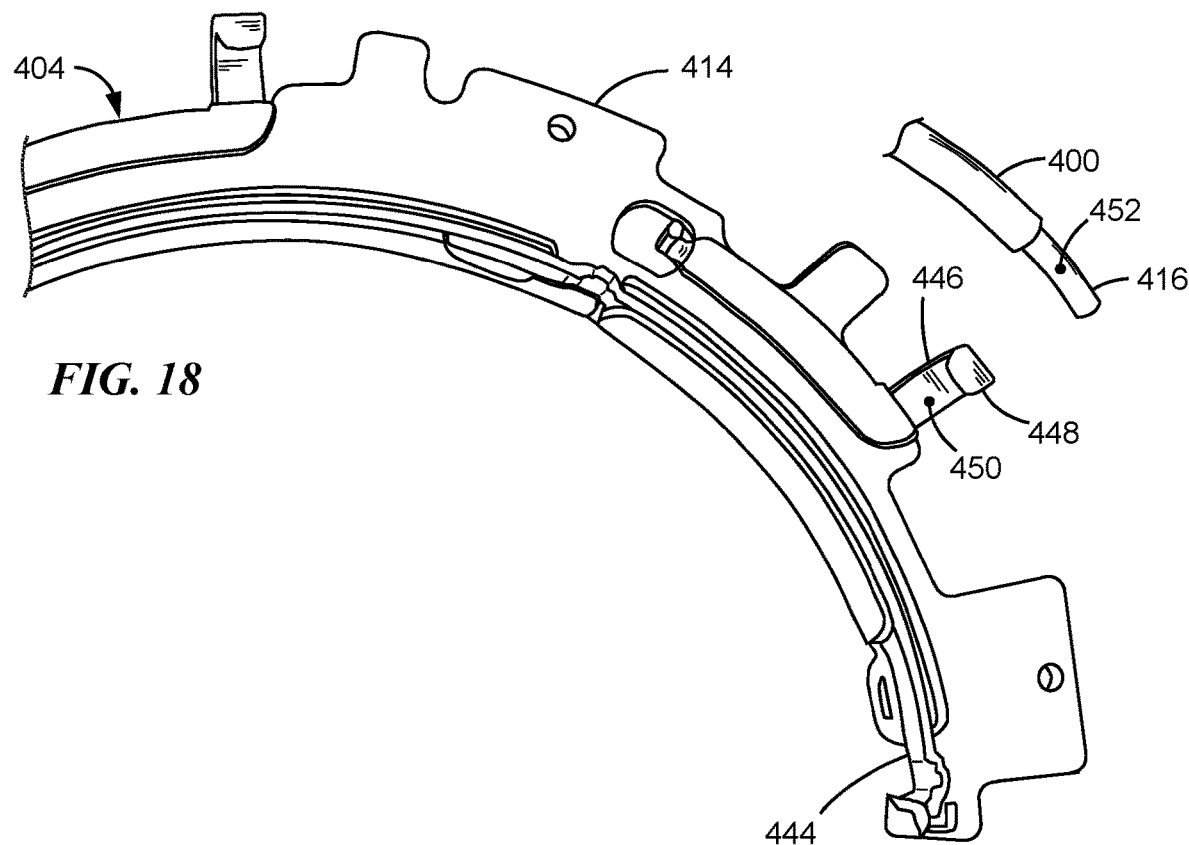
FIG. 18 is a schematic illustration of another carrier ring of an electric motor stator for an automobile application that includes an insulating body having an electrically conductive copper connector embedded therein.

Referring now to FIG. 18, which depicts a portion of another embodiment of a carrier ring 404 of a stator of a 3-phase AC automobile electric motor (not shown). The carrier ring 404 includes an insulating body 414 having an electrically conductive copper bar 444 and an electrically conductive copper connector 446 embedded therein. The copper connector 446 has a curved terminal end 448 that is configured to receive a terminal end 416 of an insulated copper wire 400 and to form an electrical and mechanical connection therewith. The copper wire 400 depicted in FIG. 18 is in the form of circular-sectioned copper bar. In order to facilitate formation of a solid joint between an inner joining surface 450 of the curved terminal end 448 of the copper connector 446 and an outer surface 452 of the terminal end 416 of the insulated copper wire 400, a joining material may be disposed on the inner joining surface 450 of the curved terminal end 448 of the copper connector 446 (FIG. 19) and/or on the outer surface 452 of the terminal end 416 of the insulated copper wire 400 (FIG. 20). The joining material may be the same as the joining material deposited on the first and second surfaces 20, 22 of the substrate 12.

Figure 19:
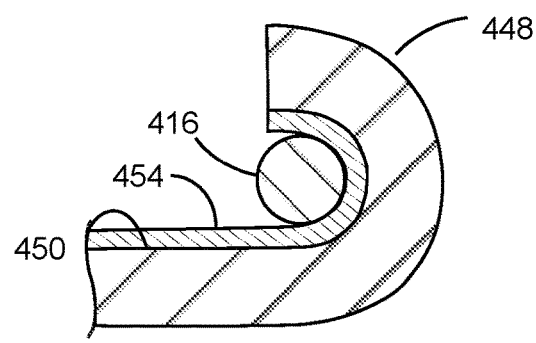
FIG. 19 depicts an arrangement for joining a terminal end of an insulated electrically conductive copper wire to a coated terminal end of the copper connector shown in FIG. 18.
Figure 20:
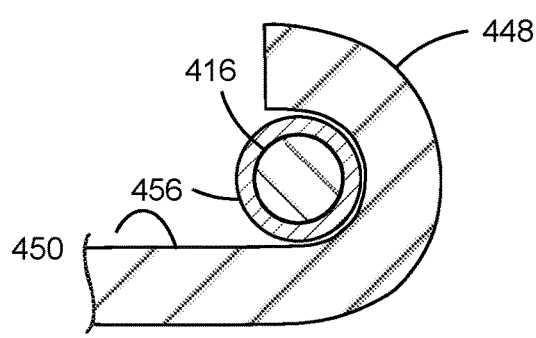
FIG. 20 depicts an arrangement for joining a coated terminal end of an insulated electrically conductive copper wire to a terminal end of the copper connector shown in FIG. 18.

As shown in FIG. 19, a coating 454 of a joining material may be formed on the inner joining surface 450 of the curved terminal end 448 of the copper connector 446 using the same cold spray or thermal spray deposition techniques as used to form the first and/or second coatings 52, 54 on the substrate 12. In one form, the coating 454 may be formed on the inner joining surface 450 of the curved terminal end 448 of the copper connector 446 at the same time one or more other coatings of joining material are formed on one or more other electrically conductive copper connectors (not shown). In such case, the plurality of copper connectors may be arranged side-by-side, with all of their inner joining surfaces facing in substantially the same direction. Thereafter, a coating of joining material may be deposited on all of the like-facing inner joining surfaces of the copper connectors at substantially the same time.

As shown in FIG. 20, a coating 456 of a joining material may be selectively formed on the outer surface 452 of the terminal end 416 of the insulated copper wire 400 using the same cold spray or thermal spray deposition techniques as used to form the first and/or second coatings 52, 54 on the substrate 12. Like the embodiments discussed above with respect to FIGS. 15A, 15B, and 15C, the coating 456 of joining material may be selectively formed on the terminal end 416 of the insulated copper wire 400 at the same time as one or more other coatings of joining material are formed on one or more other insulated copper wires (not shown). In such case, a plurality of insulated copper wires having exposed terminal ends may be arranged side-by-side, with all of the surfaces to be coated facing in substantially the same direction. Thereafter, a coating of joining material may be deposited on all of the like-facing outer joining surfaces of the copper wires at substantially the same time.

As shown in FIGS. 19 and 20, prior to joining, the terminal end 416 of the copper wire 400 and the curved terminal end 448 of the copper connector 446 may be arranged such that the outer joining surface 452 of the terminal end 416 and the inner joining surface 450 of the copper connector 446 are in facing alignment with each other at an intended joining site. Thereafter, a solid joint may be formed therebetween by applying a sufficient amount of heat to the terminal end 416 of the copper wire 400 and/or to the inner joining surface 450 of the curved terminal end 448 to melt the joining material within the coating 454 and/or the coating 456, without melting the copper wire 400 or the copper connector 446. Like the embodiments discussed above with respect to FIGS. 14A and 16A, heat may be applied to the terminal end 416 of the copper wire 400 and/or to the inner joining surface 450 of the curved terminal end 448 by any suitable method, such as by directing a laser beam (not shown) at multiple points on the respective inner and/or outer joining surfaces 450, 452 of the connector 446 and wire 400. Alternatively, discussed above with respect to FIG. 17A, heat may be generated within the coating 454 and/or the coating 456 by pressing a pair of opposing welding electrodes (not shown) against opposite sides of the curved terminal end 448 of the copper connector 446 and passing an electrical current between the electrodes and through the aligned joining surfaces 450, 452 of the copper connector 446 and the curved terminal end 448.

The above description of preferred exemplary embodiments is merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing electrically conductive copper components for an electric device, the method comprising:

providing an electrically conductive copper substrate having a first surface and an opposite second surface;

performing a surface treatment process on the first surface of the substrate such that the first surface includes a plurality of peaks and valleys and exhibits a surface roughness (Rz) in the range of 10-100 µm;

depositing a first continuous coating of an electrically conductive joining material on the first surface of the substrate; and forming the substrate into a plurality of electrically conductive copper components exhibiting a certain desired geometry, wherein each of the plurality of electrically conductive copper components includes a joining surface for establishing an electrical and mechanical connection with at least one other electrically conductive copper component, wherein a first preexisting coating of joining material is located on or adjacent to the joining surface of each of the plurality of electrically conductive copper components, wherein the electrically conductive copper substrate comprises a sheet of copper or a copper-based alloy, and the plurality of electrically conductive copper components are formed by cutting the substrate into a plurality of discrete pieces after the first continuous coating of the electrically conductive joining material is deposited on the first surface of the substrate, wherein cutting the substrate into a plurality of discrete pieces comprises stamping, blanking, die cutting, punching, laser cutting, or perforating the substrate into multiple pieces; and wherein the plurality of electrically conductive copper components comprise a plurality of electrically conductive copper tabs that each include a first surface, an opposite second surface, and an inner joining surface that at least partially defines a through-hole extending from the first surface to the second surface thereof, wherein the first preexisting coating of joining material is located on the first surface of each of the plurality of electrically conductive copper tabs, and wherein the through-hole is sized for receiving a terminal end of a copper wire.

2. The method set forth in claim 1 wherein the surface treatment process comprises:

directing a pulsed laser beam at the first surface of the substrate such that each pulse of the laser beam impinges the first surface of the substrate and removes a portion of the substrate along the first surface; and advancing the pulsed laser beam relative to the first surface of the substrate in accordance with a predetermined scanning profile such that each pulse of the pulsed laser beam produces a spot on the first surface of the substrate that partially overlaps a previously or subsequently produced spot on the first surface of the substrate.

3. The method set forth in claim 1 wherein the electrically conductive joining material comprises a copper-based metal alloy.

4. The method set forth in claim 1 wherein the first continuous coating of the electrically conductive joining material is deposited on the first surface of the substrate via a cold spray process or a thermal spray process.

5. The method set forth in claim 1 wherein the first continuous coating of the electrically conductive joining material deposited on the first surface of the substrate has a thickness in the range of 40 µm to 200 µm.

6. The method set forth in claim 1 further comprising:
performing a surface treatment process on the second surface of the substrate such that the second surface includes a plurality of peaks and valleys and exhibits a surface roughness (Rz) in the range of 10-100 μm; and
depositing a second continuous coating of an electrically conductive joining material on the second surface of the substrate opposite the first surface,
wherein, after the substrate is formed into the plurality of electrically conductive copper components, a second preexisting coating of joining material is disposed on or adjacent to the joining surface of each of the plurality of electrically conductive copper components.

7. A method of manufacturing electrically conductive copper components for an electric device, the method comprising:
providing a plurality of preformed electrically conductive copper components, wherein each electrically conductive copper component comprises an electrically conductive copper substrate having a joining surface for establishing an electrical and mechanical connection with another electrically conductive copper component;
arranging the plurality of preformed electrically conductive copper components such that the joining surfaces thereof are aligned with one another; and
depositing a continuous coating of an electrically conductive joining material on or adjacent the joining surface of each of the plurality of preformed electrically conductive copper components at substantially the same time,
wherein the joining surfaces of the plurality of preformed electrically conductive copper components are curved.

8. The method set forth in claim 7 wherein, prior to deposition of the continuous coating, the plurality of preformed electrically conductive copper components are arranged such that at least a portion of each of the joining surfaces thereof faces the same direction.

9. The method set forth in claim 8 wherein the plurality of preformed electrically conductive copper components comprise a plurality of electrically conductive copper connectors having curved terminal ends, and wherein the continuous coating of the electrically conductive joining material is deposited on the curved terminal ends of the electrically conductive copper connectors via a cold spray process or a thermal spray process.

10. The method set forth in claim 7 wherein the continuous coating of the electrically conductive joining material is deposited on or adjacent the joining surface of each of the plurality of preformed electrically conductive copper components via a cold spray process or a thermal spray process.

11. The method set forth in claim 7 wherein the continuous coating of the electrically conductive joining material deposited on or adjacent the joining surface of each of the plurality of preformed electrically conductive copper components has a thickness in the range of 40 μm to 200 μm.

12. The method set forth in claim 7 wherein the joining surfaces of the plurality of preformed electrically conductive copper components are substantially planar.

13. The method set forth in claim 7 wherein the joining surfaces of the plurality of preformed electrically conductive copper components are contoured.

14. The method set forth in claim 7 wherein the plurality of preformed electrically conductive copper components comprise a plurality of insulated copper wires having exposed terminal ends, and wherein the continuous coating of the electrically conductive joining material is deposited on the exposed terminal ends of the insulated copper wires via a cold spray process or a thermal spray process.

15. The method set forth in claim 7 wherein the electrically conductive joining material comprises a copper-based metal alloy having a melting point less than that of the electrically conductive copper substrate.

16. A method of manufacturing electrically conductive copper components for an electric device, the method comprising:
providing a plurality of preformed electrically conductive copper components, wherein each electrically conductive copper component has a joining surface for establishing an electrical and mechanical connection with another electrically conductive copper component;
arranging the plurality of preformed electrically conductive copper components such that the joining surfaces thereof are aligned with one another; and
depositing a continuous coating of an electrically conductive joining material on or adjacent the joining surface of each of the plurality of preformed electrically conductive copper components at substantially the same time,
wherein, prior to deposition of the continuous coating, the plurality of preformed electrically conductive copper components are arranged such that at least a portion of each of the joining surfaces thereof faces the same direction, and
wherein the plurality of preformed electrically conductive copper components comprise a plurality of electrically conductive copper connectors having curved terminal ends, and wherein the continuous coating of the electrically conductive joining material is deposited on the curved terminal ends of the electrically conductive copper connectors via a cold spray process or a thermal spray process.

* * * * *